United States Patent Office 3,496,697
Patented Feb. 24, 1970

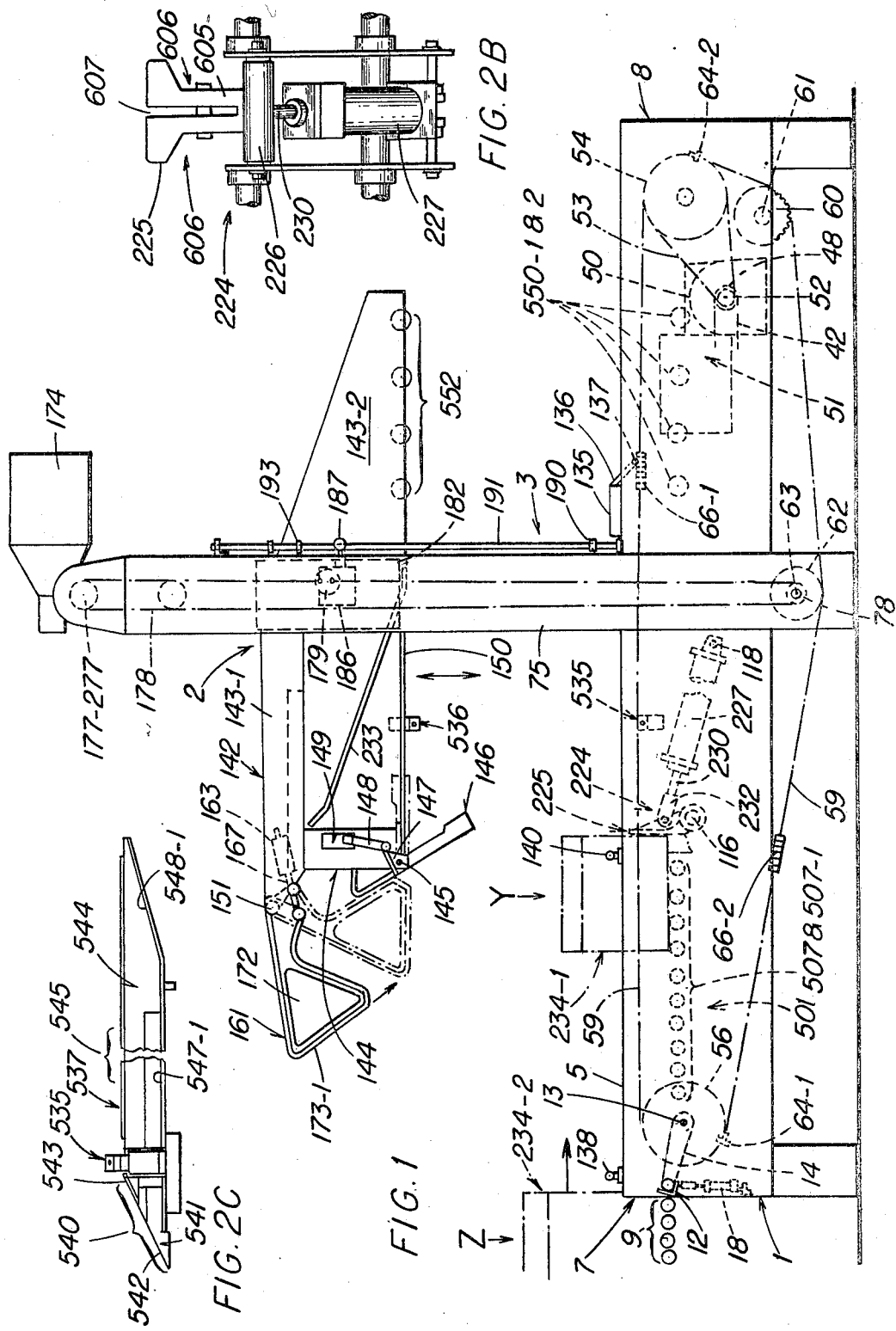

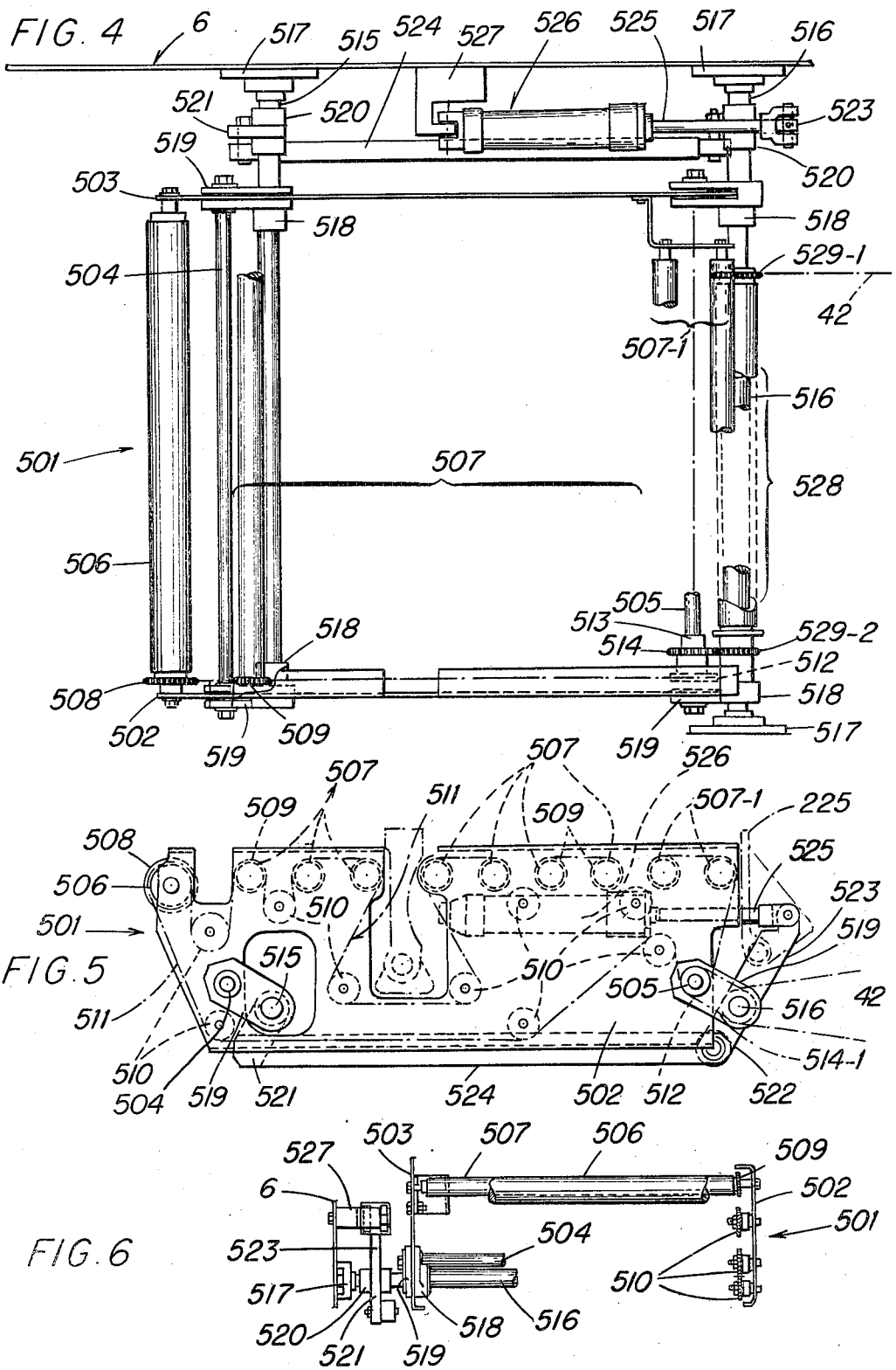

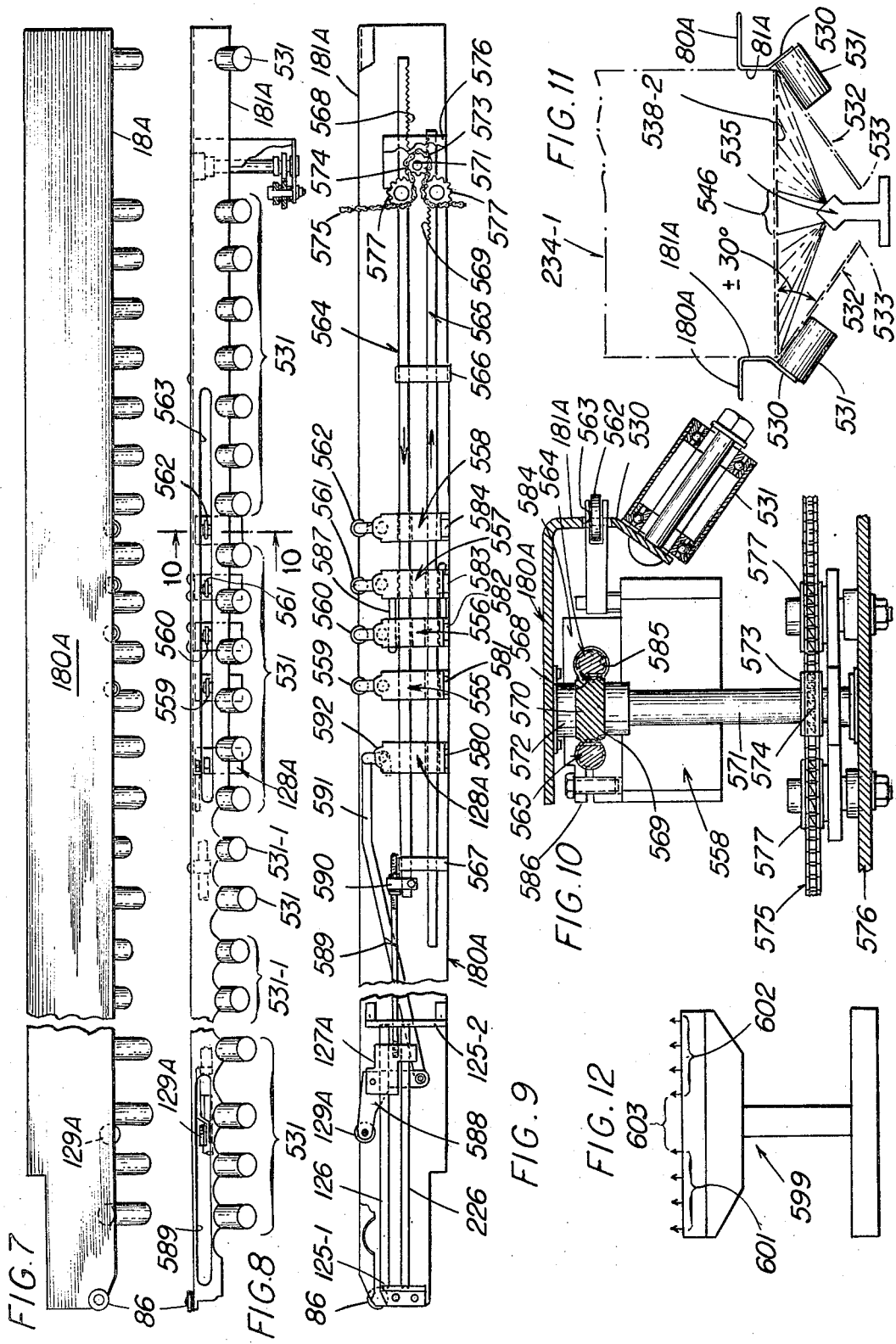

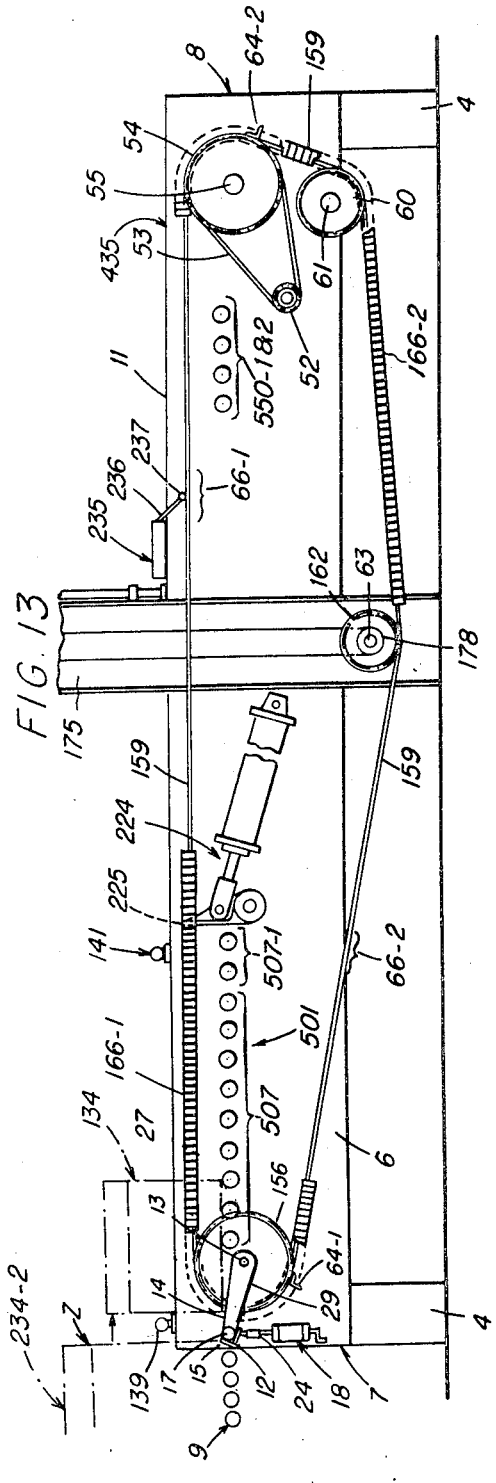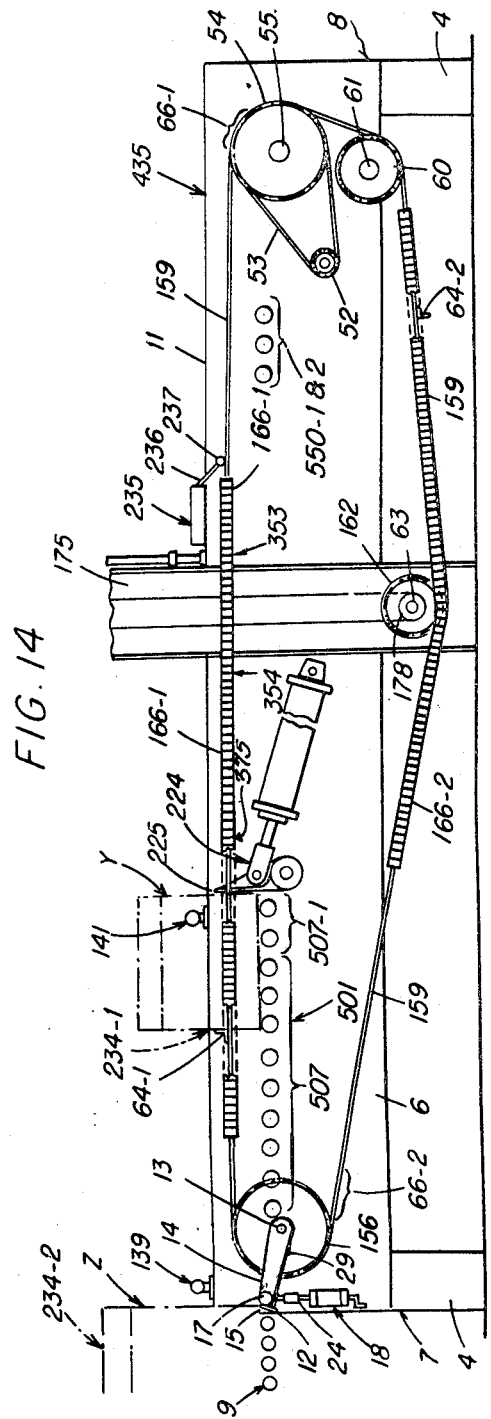

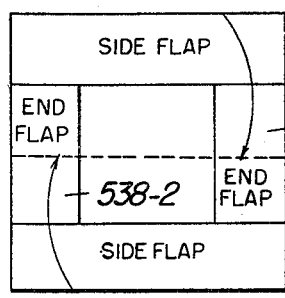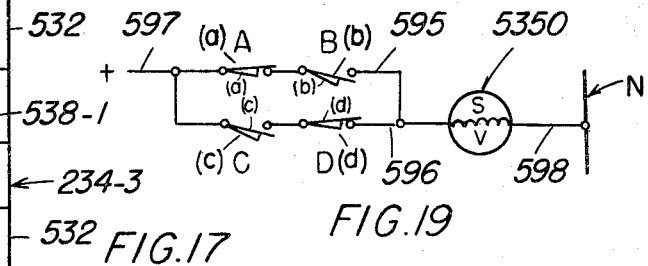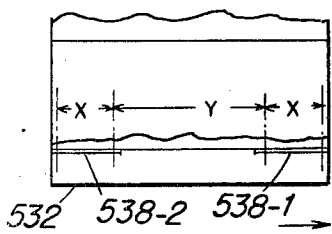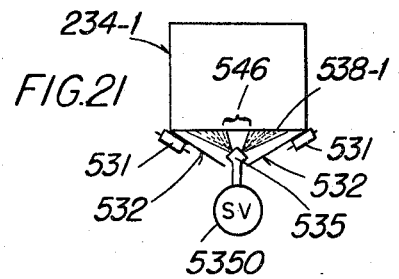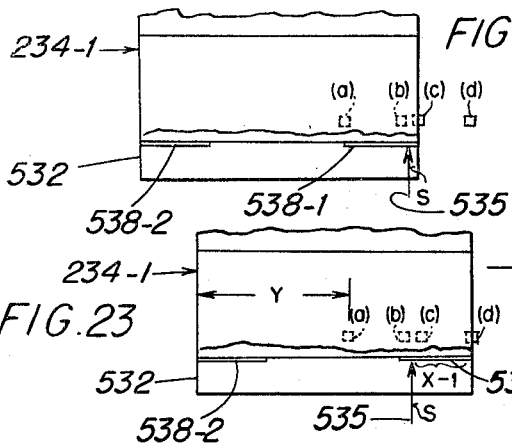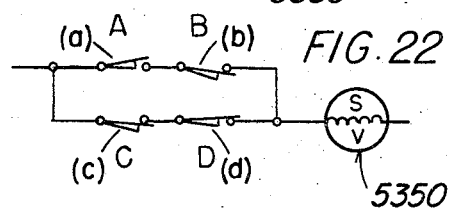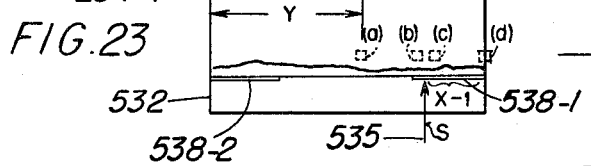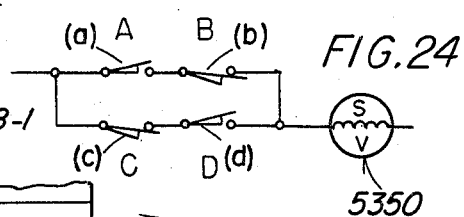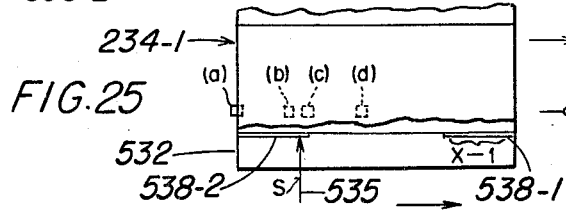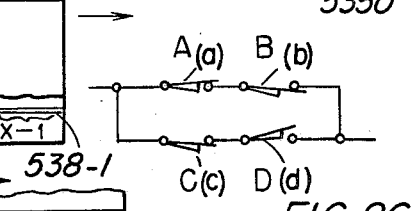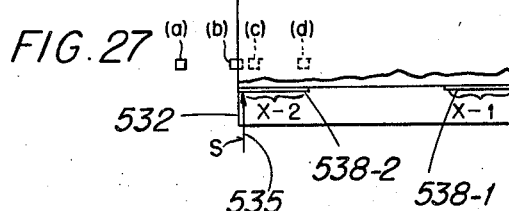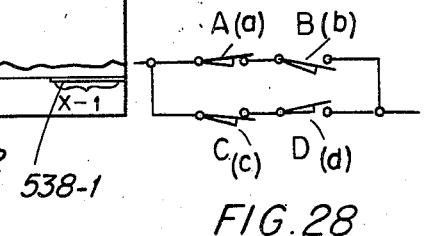

3,496,697
AUTOMATIC CARTON CLOSING MACHINE INCLUDING ADHESIVE-APPLYING MECHANISM FOR FLAPS
Winton Loveland, Freeport, and Saul Warshaw, New York, N.Y., assignors to The Loveshaw Corporation, Farmingdale, N.Y., a corporation of New York
Continuation-in-part of application Ser. No. 514,943, Dec. 20, 1965. This application Aug. 7, 1967, Ser. No. 658,713
Int. Cl. B65b 51/02, 59/02
U.S. Cl. 53—76
8 Claims

ABSTRACT OF THE DISCLOSURE

The present disclosure pertains to embodiment in an automatic carton closing machine of mechanism for applying adhesive between lapped flaps of a carton for anchoring them in carton closing positions. This adhesive-applying mechanism embodies, as an initial section of lateral conveyor means of the machine, a raised retractable carriage having driven carton transporting means extending laterally forward across the top thereof for delivery of the carton to flap folding and adhesive-applying spray heads or nozzles. Such carton has its bottom end and side flaps infolded temporarily to close the carton bottom for support of carton contents. The top end and side flaps of the carton extend upwardly in open positions. The loaded carton is brought to momentary pause at a flap folding and sensing station by a raised stop paddle beneath an elevator head which carries top flap folding means and an adhesive applicator. While the carton is pausing at this station guide rails on opposite sides thereof are moved inwardly to abutment of the carton sidewalls for initially clamping it in such stopped position. In preferred form the transporting means of the lift carriage are a plurality of transversely-extending and longitudinally-spaced driven rolls. Each of the opposed inner sides of the guide rails is equipped with a series of longitudinally-spaced and free running rollers which extend obliquely down and forward for insertion thereof beneath the unanchored and infolded bottom side flaps, some of such oblique rollers in the initial section advancing between the longitudinally-spaced rolls of the lift carriage. The latter is then downwardly retracted to transfer support of the loaded carton to such oblique rollers. The elevator head of the machine lowers to the carton top to infold the upstanding leading top end flap and to sense the height of the carton. Thereupon, the bottom side flaps open up partially to rest upon said oblique rollers and to provide a gap between their opposed free ends. The carton is then released by stop paddle retraction for further forward transport by the main conveyor section. With the bottom side flaps partially opened with continued support on additional oblique rollers the carton moves forward to a bottom adhesive-applying nozzle. As this occurs a kicker is swung down to infold forward the upstanding top back flap and then the infolded top end flaps are progressively advanced forward beneath a top adhesive-applying nozzle while the bottom adhesive-applying nozzle is received in the gap between the obliquely depending bottom side flaps. Liquid adhesive is then simultaneously fed to these top and bottom nozzles for applying it only to bottom face areas of the infolded bottom end flaps and to top face areas of the infolded top end flaps. Controls, which may be in the form of a series of electrical switches, are carried by one of the clamping and guiding rails and some of these are automatically adjustable longitudinally along this rail in relation to the size of the carton. These electrical control switches dictate the starting and stopping of delivery of liquid adhesive from the nozzles and the automatic adjustment of their positions assures application of adhesive only to face areas of the infolded end flaps. With further forward transport the bottom and top side flaps are then infolded to abutment of the adhesive-carrying infolded end flaps and are held in such positions during further carton advance until the adhesive sets enough to affix the side flaps to the end flaps for permanent carton closure.

The present application is a continuation-in-part of our copending application Ser. No. 514,943 which was filed Dec. 20, 1965, the automatic carton closing machine described and claimed therein being modified chiefly with respect to embodiment in this machine of the present adhesive-applying mechanism United States Patent No. 3,382,645 of May 14, 1968 issued on U.S. Ser. No. 514,943.

Accordingly, the present invention relates to triggered automatic control of filled packages for effecting permanent adhesive anchorage of the closing flaps thereof with the control being triggered by the presence in the machine of each of the filled packages.

The prior art has proposed automatic machines for inserting between closing flaps of filled packages suitable flap-anchoring liquid adhesive and holding the flaps together until the adhesive sets. Some of such prior art proposals involve swinging open the outermost ones of previously infolded flaps substantially to their original unfolded positions where they extend substantially normal to the planes of the ends of the cartons and even through 180° to extend laterally outward away from the carton sidewalls, applying liquid adhesive to either the outer faces of the innermost flaps which remain infolded or to the inner faces of the so unfolded outermost flaps, and then returning the latter to their infolded positions. Such flap manipulation and adhesive application involves mechanism and the operation thereof which are undesirably complicated and time consuming. These manipulations and adhesive applying procedures require extended periods of time for performance and undesirably limit the number of cartons which can be closed and sealed per minute. Due to the complication of mechanisms and the period of time to effect the desired results that are required such machines of the prior art must provide unduly long transport paths. The attendant bulkiness of such machines uneconomically cause them to occupy excessive amounts of floor space.

The present invention conserves time by avoiding necessity of completely opening up infolded outermost flaps and accomplishes the desired end of flap anchorage by inserted adhesive with relatively simple mechanism that assures an unusually short path of machine travel to complete the adhesive anchorage of the overlapping end flaps and, consequently, the occupancy by the machine of an unusual minimum of floor space. Embodiments of the machine equipped with the adhesive-applying mechanism of the present invention are capable of performing the desired operations on ten to twelve cartons per minute, which means that each carton travels completely through the machine with attendant performance of the necessary operations in five or six seconds.

The present invention involves unique adhesive-applying mechanism, embodied in an automatic carton closing machine, which is efficiently adapted for partially opening previously infolded bottom side flaps of a contents-loaded carton that are lapped beneath previously infolded leading and trailing bottom end flaps thereof, to apply flap-anchoring adhesive therebetween and to refold upward these side flaps and maintain them in folded condition until the inserted adhesive sets to attain permanent anchorage of the infolded flaps. The adhesive-applying mechanism involves improvement of the lateral conveyor means of the automatic carton closing machine which transports each such carton forward along a defined lateral path of travel from the entrance end to the discharge end of the machine. Carton support means are provided which are arranged along opposite sides of the path of travel and these are characterized by support surfaces located immediately beneath the opposed sidewalls of the loaded carton and the lines of hinging thereto of the opposed infolded bottom side flaps. These carton support surfaces are arranged at oppositely directed and downwardly-extending oblique angles to the transverse plane in which the infolded leading and trailing bottom end flaps are disposed, so that the load of the carton contents and the force of gravity cause the opposed free ends of the infolded bottom side flaps to drop down through the oblique angles to provide a gap therebetween with support of the dropped side flaps by these oblique support surfaces.

Adhesive-applying head means is supported in a relatively fixed location beneath the path of forward travel to enter the gap between the opposed and obliquely-depending free ends of the partially opened and obliquely supported bottom side flaps as the loaded carton is transported forward thereabove by the machine conveyor means. Properly timed control means are provided which respond to manipulation by the forwardly traveling carton so as to apply liquid adhesive to the bottom faces of the infolded bottom end flaps as the latter pass successively thereabove. Then means in the machine return the obliquely supported bottom side flaps up to abutment of the adhesive-carrying bottom faces of the bottom end flaps and such refolded side flaps thereafter are held in their refolded positions until the applied adhesive sets sufficiently to anchor them to the bottom end flaps by the time the reclosed carton is delivered from the discharge end of the machine.

The obliquely arranged carton support surfaces which permit the partial dropping down of the free ends of the bottom side flaps define with the bottom faces of the infolded bottom end flaps acute angles which are preferably of the order of about 30°, but other acute angular relationships are employable. These obliquely arranged carton support surfaces are preferably located in the vicinity of the opposed inner sides of a pair of transversely-spaced and longitudinally-extending members with at least one thereof movable transversely inward toward the other to adjacency of opposite sidewalls of an intervening carton which is being transported forward therebetween. Such members also are movable transversely outward away from each for reception therebetween of a following, oncoming and partially-closed, loaded carton. In the preferred form such obliquely arranged carton support surfaces are embodied as a pair of transversely-spaced series of longitudinally-spaced oblique rollers having the axes of one series extending obliquely down toward and crossing those of the other series. Further, such series of oblique rollers are desirably rotatably supported on the inner sides of the pair of spreadable and inwardly approachable longitudinal members, the latter preferably being carton guide rails.

The carton transporting conveyor means preferably includes an initial section which precedes the location of the adhesive-applying head means and which is in the form of a lowerable raised carriage equipped at the top thereof with a longitudinal series of longitudinally-spaced and transversely-extending, lateral carton supporting transport members. Such transport members may be in the form of transverse rolls spaced forward from each other, with some of the initial oblique carton support surface elements or rollers flanking opposite sides of this carriage and intervening such carton-supporting transverse members of the latter. Consequently, the support of the bottom of an entering carton may be transferred to such oblique support surface elements or rollers from the top of the lifted carriage upon lowering of the latter after the free outer and lower ends of these rollers are nosed in or inserted below the sidewalls of the roll-supported carton.

The adhesive-applying head means which may be a delivery or spraying nozzle, has associated therewith suitable flow control means, such as an on-and-off valve in a liquid adhesive supply line leading to such nozzle, periodically to start and stop flow of liquid adhesive therethrough. The machine is equipped with carton responsive sensing means to determine successively the positions of the leading hinge end and trailing free end of the leading infolded bottom end flap and, thereafter, the leading free end and the trailing hinge end of the trailing infolded bottom end flap of the oncoming carton as the latter passes the adhesive-applying head means or nozzle. Additional means which are responsive to the sensing means are provided for connecting the latter to the flow control means or valve for causing periodically and successively delivery and flow stoppage of the liquid adhesive from the head means or nozzle in properly timed relation to the forward travel of the carton, so as to confine delivery of adhesive therefrom only to areas of the bottom faces of the infolded bottom end flaps of the carton.

For example, the sensing means may be provided in the form of fuor control elements which are successively arranged along the carton path of travel and each of which is adapted to respond to the presence or absence of structure of the carton as the latter passes in the vicinity thereof. At least the first and fourth of these control elements is movably mounted to be adjustable in position longitudinally along the carton travel path. The adhesive-applying mechanism also includes means automatically to adjust in the carton travel path direction the first and fourth control elements respectively relative to the second and third control elements which intervene them so as to move these first and fourth control elements simultaneously either closer to or farther away from the intervening second and third control elements respectively in relation to the width of each advancing carton. In the latter case the means which is responsive to the carton width automatically dictates a greater amount of such spacing between such control elements when the carton is of appreciable width and less spacing when the carton is narrower, with such spacing bearing a definite relationship to the carton width.

Preferably, the means responsive to the carton width includes a pair of the transversely-spaced and longitudinally-extending guide rails with at least one thereof being automatically movable transversely inward toward the other for juxtaposing said rails to opposite sidewalls of the intervening carton which is being transported forward therebetween by the conveyor means. Thus when such guide rails are initially located farthest apart transversely of the machine the first and fourth control elements will be spaced respectively from the intervening second and third control elements at the greatest distances, and as the opposed inner sides of the guide rails are caused to move gradually inward to the opposite sidewalls of a relatively narrow carton the first and fourth control elements are caused to move toward each other gradually to decrease the spacings between them and respectively the second and third control elements.

In a preferred embodiment of the present invention these four control elements are mounted on one of the guide rails which is transversely movable toward the other with means being provided to dictate longitudinal translation of the movable first and fourth control elements along the extent of this rail. In the practice of such embodiment it is preferred that the intervening second and third control elements be mounted to this rail in relatively fixed positions. When such plurality of control elements are mounted on this movable guide rail each is provided with an operating trigger which extends inward from the inner carton sidewall-engaging side of the rail into the path of the opposed sidewall of the carton as the latter is advanced therealong. In such case each control element is dictated to assume one control condition by its trigger when the later is free from engagement with carton sidewall structure and another control condition when the trigger is engaged by carton sidewall structure. Thus, as the vertical, leading end edge of the opposed carton sidewall manipulates or depresses the trigger of one of the control elements the spray head may begin delivery of a liquid adhesive to the lower face of the infolded bottom leading end flap in the near vicinity of its leading hinge line, such as about a half of to an inch back thereof. With further continued forward travel of the carton the tripping of the trigger of the next succeeding control element by the leading edge of this carton sidewall may then dictate termination of such delivery of the liquid adhesive to the lower face of this infolded bottom end flap, and preferably appreciably short of the free end of this flap so as to assure that no liquid adhesive will be sprayed upon the bottom of the contents of the carton when the free ends of the infolded bottom end flaps are spaced longitudinally apart. Continued advance of the carton will ultimately successively free the triggers of the control elements back beyond the vertical, trailing end edge of this opposed carton sidewall. Thus, as the trigger of one of the control elements is so freed to permit this control element to assume its initial condition the spray head may be caused to deliver liquid adhesive to the lower surface of the infolded bottom trailing end flap, preferably an appreciable distance back of its leading free end; and finally the freeing of a trigger of another one of the control elements behind the trailing end edge of the opposed carton sidewall will then dictate discontinuance of delivery of the liquid adhesive from the spray head and preferably short of the hinge line of this infolded trailing bottom end flap, such as about a half to an inch forward of the latter.

When the series of four control elements are in the form of circuit switches connected into suitable circuitry which dictate through a solenoid valve initiating and terminating delivery of liquid adhesive from the spray head the circuitry may be such that triggering of the first and second control means as they are successively passed by the advancing opposed carton sidewall do not cause delivery of liquid adhesive from the spray head, but the triggering of the third control switch does initiate the start of the delivery to the lower face of the leading infolded bottom end flap and the following triggering of the fourth control switch terminates such delivery. In such circuitry the freeing of the trigger of the first control switch behind the back end of the opposed carton sidewall may then initiate delivery of the liquid adhesive to the lower face of the infolded trailing bottom end flap while the following release of the trigger of the second control switch from behind the back end of such carton sidewall terminates such adhesive delivery.

The means for translating certain of the control elements or switches longitudinally of the clamping rail on which they are mounted, such as the first and fourth thereof, may be in a relatively simple form comprising a pair of substantially parallel and longitudinally-slidable rack bars with each having a series of rack teeth meshed with rotatable pinion means also carried by this rail, so that translation of the rack bars longitudinally in opposite directions may be attained by rotating the pinion means in one direction. Thus, when the pinion means which is meshed with the rack teeth of both racks bars is rotated in the opposite direction the rack bars will be translated longitudinally in directions opposite to those in which they were first moved. The pinion means may be driven by a spur gear fixed thereto for such reversing rotation and the spur gear may have an arc thereof meshed with a transversely-extending chain fixed at opposite ends to opposed sides of the base of the machine, so that when the rail is moved transversely forth and back toward and from the opposite other of this machine base structure, in its approach to the sidewall of a carton or back away therefrom, the spur gear and pinion will be simultaneously rotated in opposite directions to effect such longitudinal motion of the rack bars.

In the practice of the present invention the obliquely arranged bottom side flap supporting surfaces may be in various forms, such as, for example, longitudinally-extending continuous, obliquely opposed glide surfaces of elongated angular plates extending transversely down toward each other and longitudinally along the sides of the path of carton travel, as well as in the form of the opposed series of obliquely oriented, free running rollers herein illustrated. Likewise, a pair of transversely-spaced series of obliquely arranged and longitudinally spaced teeth having upper glide surfaces may be substituted for the two series of oblique rollers above described. Also, while it may be preferred that such obliquely arranged flap supporting surfaces be carried by the opposed inner sides of the transversely-movable and elongated guide rails they may be mounted upon supplemental movable means which are translated automatically transversely inward and outward relative to each other with respect to opposed sides of a carton advancing therebetween in unison with such guide rails for inserting the oblique supporting surfaces thereof beneath the bottom side edges of an advancing carton and the unanchored bottom side flaps of the latter. Additionally, although the downwardly-retractable lift and rolls-equipped carriage may be preferred as the initial section of the conveyor means for transporting cartons successively through the machine its function of transferring the support of each carton to the obliquely-arranged supporting surfaces may be performed by other carton transporting means located above the latter out of positions of interference therewith and so designed to release the load of each carton to such oblique surfaces in properly timed relation. For example, the retractable lift carriage may embody in the top structure thereof, to serve as the longitudinal series of longitudinally-spaced lateral members for transport support of the carton, an element similar to a double-edged comb having a continuous mid-zone from which two sets of teeth or fingers extend laterally in opposite directions with the oblique rollers, or equivalent means, arranged to be disposed in the slots between the teeth or fingers in the raised position of the carriage, and a top run of a narrow and endless carton-transporting belt or chain conveyor may extend over the continuous mid-zone of such comb structure; and for the latter may be substituted a series of longitudinally-spaced inverted U-shaped straps having flat and transversely-extending mid-sections defining together the top of the lift carriage. Further, while it is convenient to mount the control means such as the plurality of triggered control elements or switches on one or both of the guide rails, their functions may be performed by similar control elements supported by the base of the machine beneath the path of travel of the temporarily closed bottom of each advancing carton with longitudinal position adjustment of some thereof attained by similar mechanism connected in responsive manner to the transversely movable guide rails. While such control elements have proven to be successful in performing their intended services when in the form of electrical switches embodied in suitable circuitry it is to be further understood that they may be in the form of photocell means supported on machine base structure, such as the far side rail thereof, and associated with suitable circuitry switches for selective operation thereof with such photocell means responding to passage therepast of advancing carton structure and with certain ones of them being longitudinally adjustable in a manner similar or equivalent to that provided herein for the longitudinal adjustment of such control switches. If a similar pair of rack rods, mounted for longitudinal sliding in opposite directions upon one side of the base frame, are to be employed for moving the first and fourth of such photocell units (which may be fixedly carried by these rods in adjustable positions) farther from and closer to the intervening second and third photocell units with the spreading and approach movement of the guide rails, the pinion which translates the rack rods longitudinally may be driven by a spur gear fixed to the pinion. This gear and pinion may be periodically and successively rotated in opposite directions by an endless driving chain lapped about this gear with a pair of opposed runs thereof extending transversely across the machine base and for lap about an idler gear on the opposite side, with one of these runs fastened to one of the transversely-movable guide rails so that the transversely in and out motion of the latter will rotate the gear and pinion back and forth.

Other objects of the invention will in part be obvious and will in part appear from reference to the following detailed description taken in connection with the accompanying drawings, wherein like numerals identify similar parts throughout, and in which:

FIG. 1 is a side elevational view to reduced scale, with parts omitted for clarity, of an automatic carton closing machine which embodies adhesive-applying mechanism of the present invention;

FIG. 2B is an end elevational view to enlarged scale of the stop paddle shown in FIG. 1 which serves to stop the advancing carton in proper position beneath the top flap closing elevator head;

FIG. 2C is a side elevational view, with parts broken away, of the adhesive-applying spray head and associated structure mounted in the bed unit of the machine beyond the stop paddle for applying adhesive to lower areas of the infolded carton bottom end flaps up between the partially open bottom side flaps, and including means to lift the latter up to their former infolded positions;

FIG. 4 is a top plan view to enlarged scale, with parts broken away and with duplicates of elements shown therein being omitted while the locations thereof are indicated, of an initial section of the conveyor means mounted in the bed unit in the form of a lowerable carton conveying carriage;

FIG. 5 is a side elevational view of the carriage shown in FIG. 4;

FIG. 6 is a front end elevational view to reduced scale of the carriage shown in FIGS. 4 and 5;

Figure 2A:
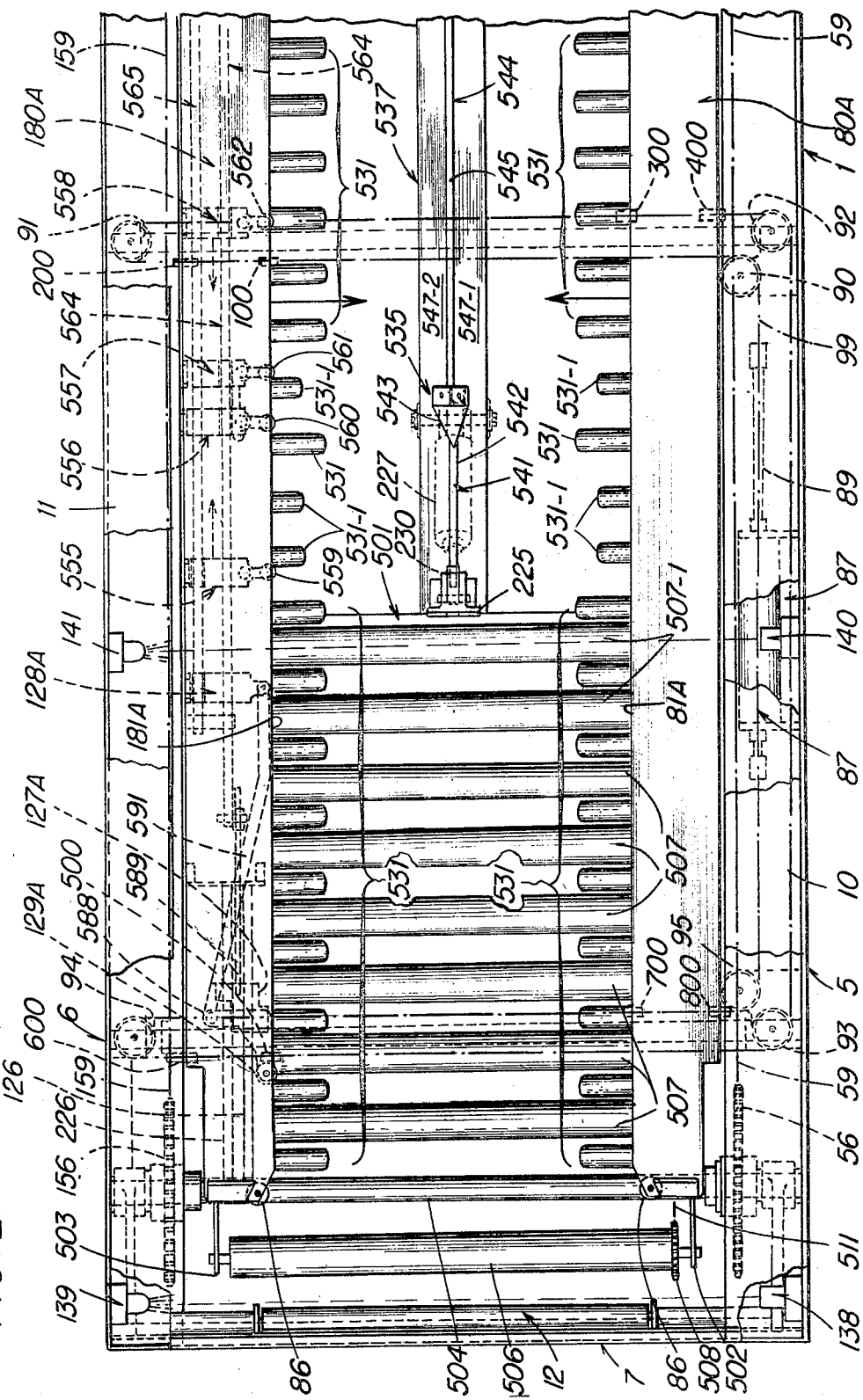
FIG. 2A is a top plan view to larger scale, with parts broken away, of the entrance end of the bed unit of the machine shown in FIG. 1, and illustrating features of the present adhesive-applying mechanism.
Figure 3:
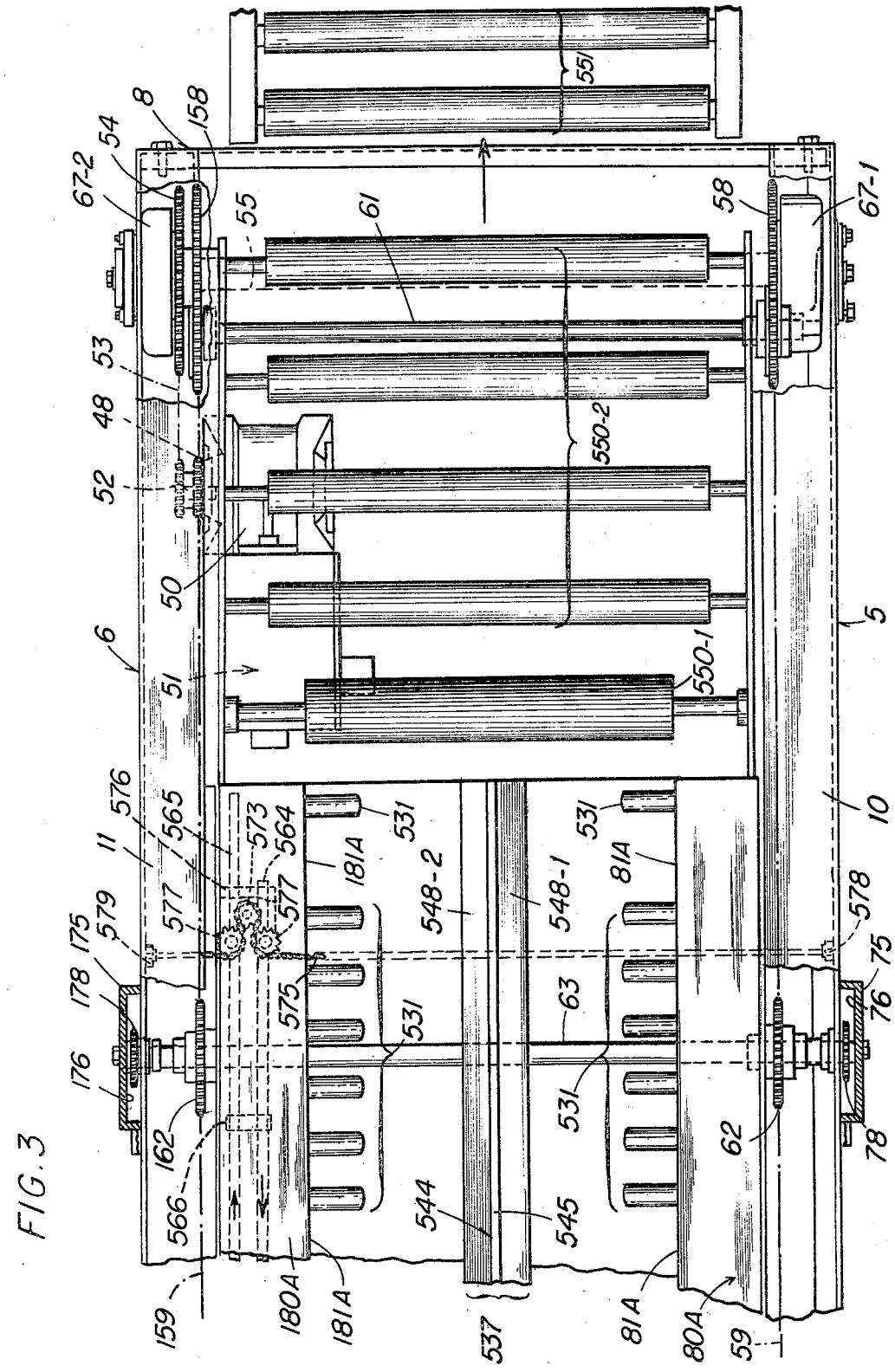
FIG. 3 is a view similar to FIG. 2A, with parts broken away and in section, of the remaining discharge end of the bed unit of the machine.
Figure 15:
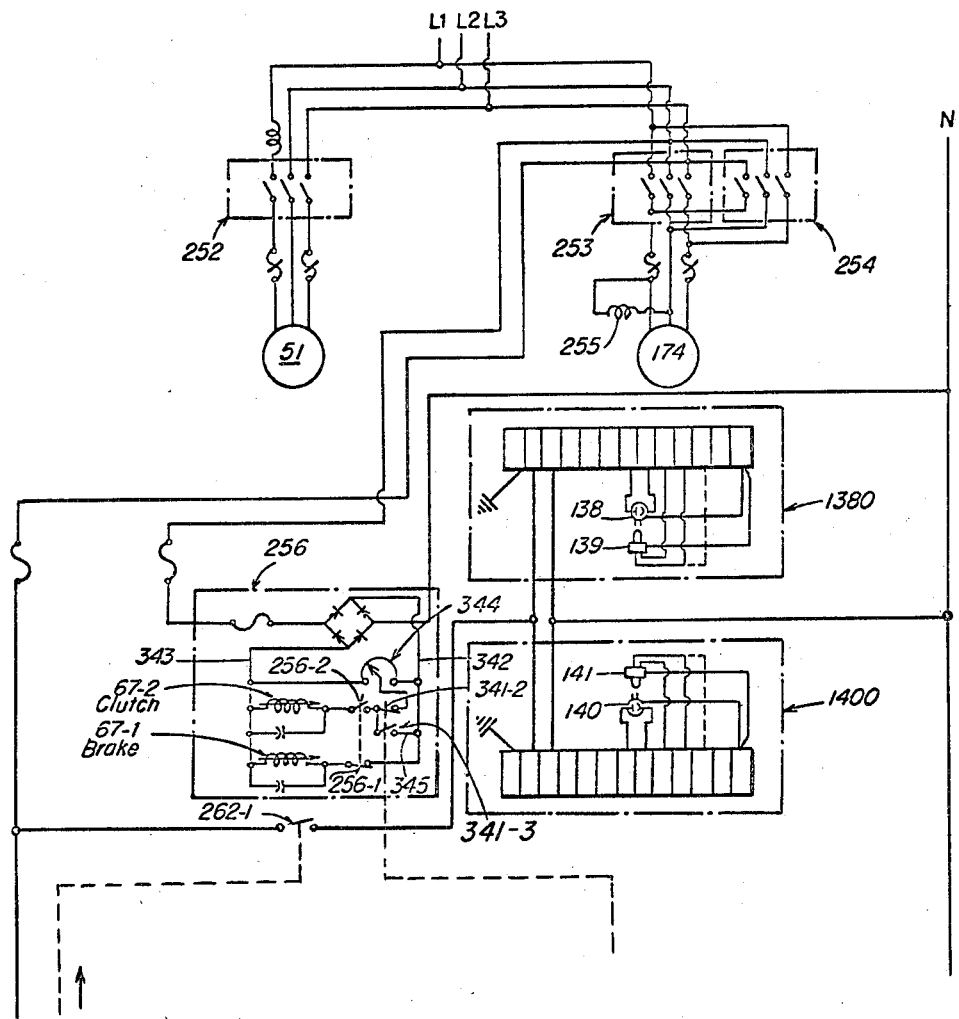
Figure 16:
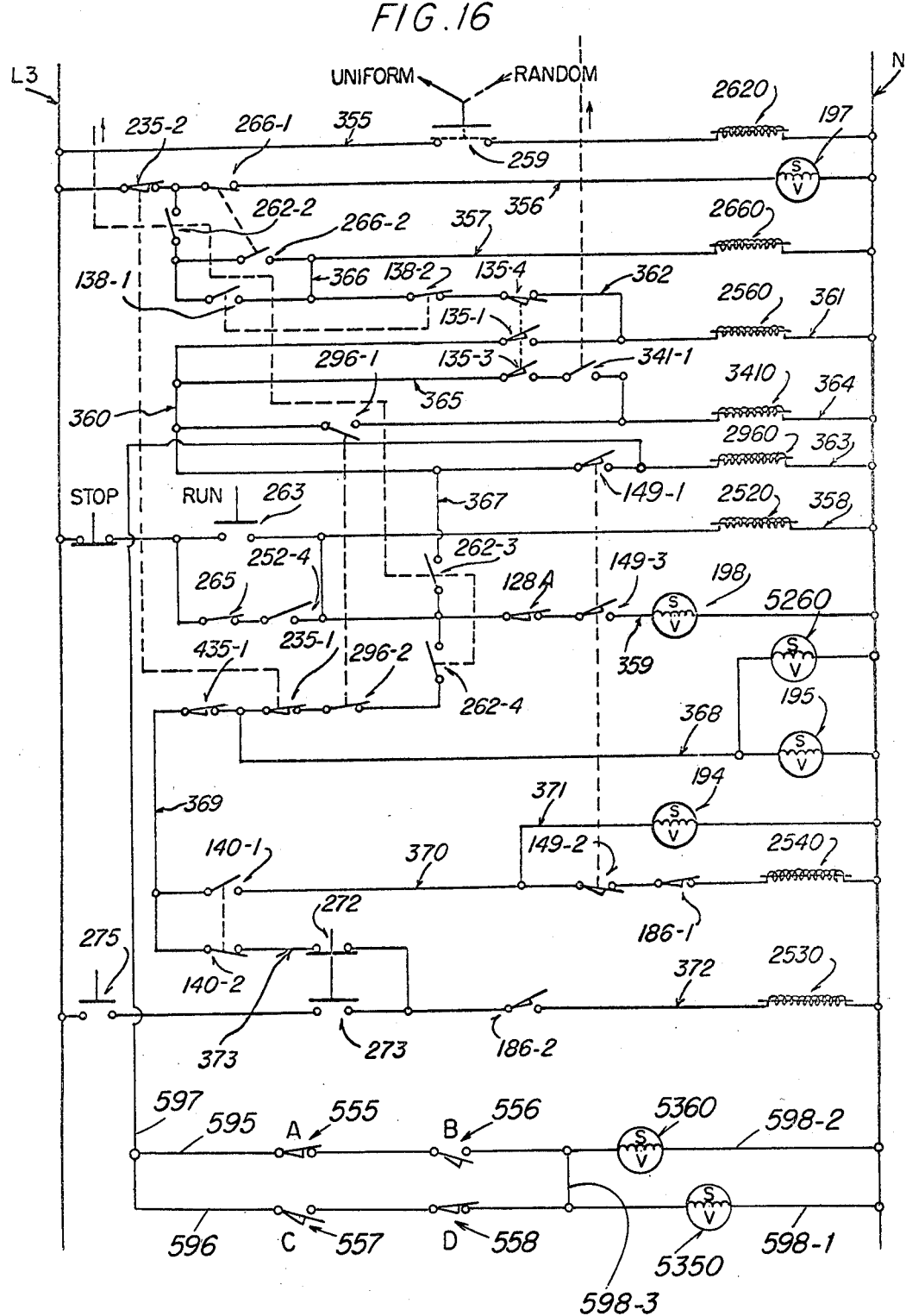

FIG. 7 is a top plan view, with parts broken away, of one of the carton clamping and guiding rails shown in FIGS. 2A and 3, depicting the means mounted thereon to provide downwardly extending oblique carton supporting surfaces for receiving the load of the filled carton from the conveyor carriage of FIGS. 4, 5 and 6, and also an embodiment of the control means provided on this rail for dictating the discharge of liquid adhesive from suitable spray heads shown in FIGS. 1 and 2C as being mounted respectively in the bed unit and on the elevator head;

FIG. 8 is an inner side elevational view, with parts broken away, of the guide rail shown in FIG. 7;

FIG. 9 is a bottom plan view, with parts broken away, of the guide rail shown in FIGS. 7 and 8;

FIG. 10 is a sectional view to enlarged scale, with parts broken away taken substantially on line 10—10 of FIG. 8;

FIG. 11 is a diagrammatic view of a bottom portion of a loaded carton which has been transferred from the conveyor carriage of FIGS. 4, 5 and 6 to the opposed pair of clamping and guide rails, with the top portion of the carton being illustrated in phantom and broken away, and depicting the employment of a wet glue spray head and its action in applying wet glue as the adhesive to lower infolded bottom end flaps;

FIG. 12 is an end elevational view to larger scale of a spray head designed to deliver hot melt or liquid thermoplastic adhesive to the lower faces of the infolded bottom end flaps;

FIG. 13 is a partially diagrammatic side elevational view, with parts broken away and omitted for clarity, of the automatic carton closing machine shown in FIG. 1, the near or operator side thereof being removed for observation of chain conveyor operated control mechanism located on the far or machine side thereof;

FIG. 14 is a view similar to FIG. 13 showing the advance position of parts of such mechanism illustrated in the latter as the carton is delivered to the top flap folding station Y with the parts of the chain conveyor being advanced to positions assuring substantially instantaneous pickup thereby of a carton at this flap folding station afttr the upstanding leading top end flap has been infolded;

FIG. 15 is a schematic wiring diagram of a portion of the electrical circuitry of the automatic carton closing machine depicted in FIGS. 1, 2A and 3, including that employed for operating the main machine motor, the elevating motor, the photocell sensing units, and the clutch and brake of the drive of the chain conveyor;

FIG. 16 is a schematic wiring diagram of the remaining portion of the electrical circuitry which is associated with that depicted in FIG. 15 for dictating operation of the various parts of the machine in properly timed relation;

FIG. 17 is a bottom plan view to small scale of a typical carton showing its bottom end flaps infolded and with the side flaps readied to be infolded before putting a load thereinto;

FIG. 18 is a diagrammatic view showing in side elevation a portion of the carton depicted in FIG. 17 after loading, with its bottom side flaps depending in partially opened positions and illustrating the relative locations of a plurality of control units which dictate the delivery of liquid adhesive from a spray head to lower surfaces of the infolded bottom end flaps by mechanism illustrated in FIGS. 1, 2A, 2C and 7 to 11 incl., this figure illustrating initial relative positions of the advancing carton and the operating triggers of the plurality of control switches;

FIG. 19 is a schematic wiring diagram of circuitry in which the control switches operated by their triggers indicated in FIG. 18 is embodied, and including the solenoid valve which controls the delivery of the liquid adhesive from the spray head;

FIG. 20 is a diagrammatic view similar to FIG. 18 showing further advance of the carton relative to the operating triggers of the control switches at the instant when the latter dictate initial delivery of liquid adhesive from the spray head to the bottom face of the leading infolded bottom end flap;

FIG. 21 is a diagrammatic end elevational view of the loaded carton illustrated in FIGS. 18 and 20, depicting the delivery operation of the spray head;

FIG. 22 is a schematic wiring diagram of the circuitry illustrated in FIG. 19 depicting the relative conditions of the control switches at the instant of carton advance and initiation of the delivery of liquid adhesive depicted in FIG. 20;

FIG. 23 is a diagrammatic vietw similar to FIG. 20 illustrating still further carton advance relative to the triggers of the control switches at the instant when delivery of liquid adhesive from the spray head is stopped after completing application of the adhesive to the lower face of the leading infolded bottom end flap;

FIG. 24 is a schematic wiring diagram similar to FIGS. 19 and 22 depicting the condition of the control circuitry at the instant illustrated in FIG. 23;

FIG. 25 is a diagrammatic view similar to FIG. 20 illustrating additional advance of the carton relative to the control switch triggers and depicting the condition which dictates delivery of liquid adhesive from the spray head for now applying the adhesive to the lower face of the trailing infolded bottom end flap;

FIG. 26 is a schematic wiring diagram similar to FIGS. 19, 22 and 24 depicting the condition of the control cicruitry at the instant illustrated in FIG. 25;

FIG. 27 is a diagrammatic view similar to FIG. 23 illustrating termination of the delivery of liquid adhesivet to the lower face of the trailing infolded bottom end flap; and FIG. 28 is a schematic wiring diagram similar to FIGS. 19, 22, 24 and 26 depicting the condition of the control circuitry at the instant illustrated in FIG. 27.

Since the present application is a continuation-in-part of our above-identified United States Patent No. 3,382,645, with certain structure thereof modified to embody in the automatic carton closing machine of this parent application the adhesive-applying mechanism of the present invention, the above drawings employ such views as are believed to be necessary to the illustration of such improvement in this machine and the operations of the present improved mechanism. For further understanding of the machine details and operations thereof which do not have a direct bearing upon the present invention reference to this identified parent application is invited.

The embodiment of the automatic carton closing machine illustrated by way of example in the drawings comprises a bed unit 1 and an elevating head unit 2 supported on the former by upwardly-extending standards or columnar structure 3. Conventionally the parts of the machine are made of suitable metals. The bed unit 1 has a rectangular frame structure which may include opposed sidewalls 5 and 6, a relatively low end wall 7 at the entrance end, and another end wall 8 at the discharge end.

The bed unit 1 is equipped with lateral conveyor means suitably supported by the frame sidewalls 5 and 6, and this conveyor means has an entrance end in the vicinity of end wall 7 and a discharge end in the vicinity of end wall 8. This conveyor means defines a longitudinal path of forward carton travel along which it successively transports a plurality of open-top cartons which may be of random sizes including quite narrow ones. Such cartons are of conventional form being constructed, if desired. from corrugated board and rectangular in cross section with the edges of the top and bottom thereof provided with normally-extending front and back flaps respectivetly on the leading and trailing top and bottom edges and opposed normally-extending side flaps on the side top and bottom etdges, all to be infolded to closed lateral lapping positions for securement in carton closing positions. The machine of the present invention is designed automatically to close successively the tops of such cartons in this manner after they have been loaded with the products to be marketed or shipped therein, and both the tops and botoms have been sealed by adhesive anchorage of the flaps. Accordingly, any suitable feeding means, such as a roller conveyor 9, illustrated in FIG. 1, will be mounted adjacent the entrance end of the bed unit 1, i.e., adjacent the end wall 7, successively to feed a supply of the loaded cartons over the top edge of the latter to the conveyor means. The frame structure of the bed unit 1 may include lateral sheet metal ledges 10 and 11 extending inwardly from the top edges of the sidewalls 5 and 6 for support of certain control devices as will appear hereinafter, and strengthening cross framing members may be embodied.

At the entrance end of the bed unit 1, in the vicinity of end wall 7, is mounted a liftable gate 12 shown in FIGS. 1 and 2A. A cross shaft 13 at the entrance end of the bed unit 1, having its ends supported by sidewalls 5 and 6 of the frame structure, pivotally supports a pair of swinging arms 14 which carry on their back ends the entrance gate structure 12. The entrance gate 12 is lifted to carton-barring position with upward swing of its arms by pneumatic motor 18.

The conveyor means includes an initial section 501 having a plurality of continuously driven rolls 507 and 507–1 to be described in detail later. A succeeding conveyor section is provided in the form of a chain conveyor and, for this purpose, cross shaft 13 also carries, rotatably supported thereon, a pair of near and far idler sprockets 56 and 156, as will be seen in FIG. 2A, while a cross shaft 55 at the discharge end of the bed unit 1 is rotatably carried by frame sidewalls 5 and 6. As will be seen in FIG. 3, a main machine driving, electric motor 51 drives through a reduction gear unit 50 a pair of concentric driving gears 48 and 52 about which are respectively lapped endless driving chains 42 and 53. Chain 53 drives a sprocket 54 rotatably supported on cross shaft 55. Drive cross shaft 55 carries fixed thereto a pair of near and far sprockets 58 and 158 respectively aligned with idler sprockets 56 and 156. The second endless conveyor section preferably is in the form of a pair of endless chains, indicated by dot-dash lines 59 and 159 in FIGS. 2A and 3, respectively lapped about sprockets 56 and 58, and 156 and 158, for drive by sprockets 58 and 158. As will be best understood from FIG. 1, the lower run of each of the endless chains 59 and 159 is lapped beneath one of a pair of idlers 60 and 160 rotatably supported by a cross shaft 61 mounted between frame sidewalls 5 and 6, and beneath another of a pair of idlers 62 and 162 rotatably supported by another cross shaft 63. The second endless conveyor section also includes a series of carton transporting flight bars which, as is indicated at 64–1 and 64–2 in FIG. 1, may be two in number spaced longitudinally appreciably apart. The endless conveyor chain 59 on the near or operator side, as viewed in FIG. 1, also is equipped with a pair of tripping lugs 66–1 and 66–2 to be carried along therewith for operating certain limit conveyor means, and similar but longer tripping lugs 266–1 and 266–2 are mounted for a similar purpose on the companion conveyor chain 159 (located on the far or machine side) as is demonstrated in FIGS. 13 and 14.

The near end of driven cross shaft 55 on the operator side of the bed unit 1 carries a housed magnetic brake 67–1 and the far end thereof carries a housed magnetic clutch 67–2, both of which are indicated in FIG. 3, and these units may be of conventional construction.

As will be understood from FIGS. 1 and 3, the support structure 3 includes an opposed pair of upwardly-extending standards or columns 75 and 175 which constitute supports for the elevating head unit 2, and these columns are fixedly mounted to the frame sidewalls 5 and 6 of the bed unit 1 in any suitable manner. The columns 75 and 175 preferably are of channel construction so as to provide guiding channels 76 and 176 for opposed slides 182 together constituting carriage means therein that serve to carry a flap folding sub-assembly, and to house elevating mechanism. Opposite ends of the cross shaft 63 extend into the channels 76 and 176 within which this shaft rotatably supports sprockets 78 and 178, forming a part of head elevating mechanism.

As will be understood from FIGS. 2A and 3, the bed unit 1 is equipped with suitable carton clamping and carton travel guide means, preferably extending from the vicinity of the entrance end to a distance short of the discharge end of the bed unit 1, but entirely through the carton sensing and flap folding station in the vicinity of the discharge end of the initial conveyor section 501. This carton clamping and guiding structure may be in the form of a pair of rails 80A and 180A, having inner sides thereof 81A and 181A opposed. The clamping and guiding rails 80A and 180A are suitably supported by slides on transverse rods mounted to the frame sidewalls 5 and 6, for transverse movement inward and outward relative to the center of the path of carton travel defined by the longitudinally-extending conveyor means. In their outward positions, depicted in FIGS. 2A and 3, the rails 80A and 180A are at their initial carton-receptive positions to permit a carton fed over depressed gate 12 to the entrance end of the initial conveyor section 501 to advance therebetween. The front end of each of the rails 80A and 180A preferably is equipped with a freely rotating carton guide roller 86 to facilitate entrance of a carton therebetween. The clamping and guiding rails 80A and 180A are slid transversely back and forth on their guide rods by suitable driving mechanism, hereinafter briefly described. The approach end of guiding and clamping rail 180A carries opposite the initial conveyor section 501, in the area of the carton sensing and flap folding station an adjustable control or sensing device 128A and 129A, as will be seen in FIG. 2A, hereinafter more fully described in connection with FIGS. 7 to 10 incl.

The machine bed unit 1 also is provided with additional control equipment. As will be seen from FIG. 1, the frame of the bed unit 1 supports a limit control 135, which may be in the form of electrical circuit switching means having a plurality of switches mechanically linked together for simultaneous operation. The limit switch unit 135 is provided with an actuating trigger 136 designed to be swung up and down and biased to its downward position with a drag roller 137 carried by its lower end. Limit switch 135 preferably is supported upon ledge 10 beyond the head-supporting upright column 75, so that the roller 137 on the actuating trigger 136 will be dragged over the next oncoming traveling lug 66–1 or 66–2 carried by conveyor chain 59. When the upper run of conveyor chain 59 in its forward travel causes lug 66–1 to engage the trigger 136, the latter will be swung up to actuate open switches 135–1 and 135–3 and closed switch 135–4 in the limit switch unit 135, and these circuit switches will be held to their respective manipulated positions until this run of the conveyor chain advances sufficiently to free the trigger which then permit these limit switches to be returned to their initial positions. A similar limit switch unit 235 preferably is mounted at a similar location on frame ledge 11 (FIGS. 13 and 14) to be tripped by lugs 266–1 and 266–2 carried by conveyor chain 159, which has therein normally closed limit switches 235–1 and 235–2.

Additional sensing devices are provided on the machine bed unit 1, which may be in the form of optical carton sensing devices. For example, as will be seen from FIGS. 1 and 2A, the ledge 10 may support at 138, in the vicinity of the selector gate 12 and slightly in advance thereof a photocell responsive to the light beam from a light source 139 supported on the opposite side by ledge 11. At the sensing and flap folding station Y ledge 10 may support in similar fashion a second photocell 140 arranged opposite to a second light source 141 for response to the light beam projected from the latter. In FIG. 1 is shown in dot-dash lines an open-top carton 234–1 located opposite the photocell optical sensing device 140 at the sensing and flap folding station Y, beneath a flap folding and carton closing elevator head 142 supported for elevating travel upon the upright columns 75 and 175. Elevator head 142 includes a lateral frame member or beam 143–1 which supports a flap folding sub-assembly which may include a depending post 144. The bottom end of depending post 144 pivotally carries at 145 a front flap folding arm structure 146, which, due to gravity biasing, normally depends in the top elevated position of the head 142 shown in FIG. 1 obliquely down and forward to the full line position shown therein. The front flap folding arm structure 146 carries a finger 147 which engages a trigger 148 of another limit control, which may be an electrical circuit switch device 149 supported on the post 144. In the full line position of the front flap folding arm structure 146 shown in FIG. 1 its finger 147 holds the switch trigger 148 forward to a tripped position to hold the switching mechanism of switch device 149 in one of its open and closed positions. When the front flap folding arm structure 146 is swung upward to a lateral position, indicated by broken lines in FIG. 1, the trigger 148 of switch device 149 is released to permit this switch device to be actuated to the other of its two positions. The bottom of the depending post 144 has anchored thereto one end of a folded flap hold-down strap 150 which extends forward therefrom. The elevating flap folding head 142 also has a forwardly extending lateral beam extension 143–2 which supports suitable flap or pressing equipment which may be in the form of a series of free running rollers 552 for a purpose explained later.

The lateral frame member or beam extension 143–1 of head 142 pivotally supports at 151 a carton back flap folding arm or kicker 161 as part of the flap folding sub-assembly, as will be seen from FIG. 1. The back flap folding arm or kicker 161 is normally held in an extended or substantially lateral position when the flap folding head 142 is elevated to the maximum height of its vertical travel, as is shown in FIG. 1. For this purpose the lateral beam 143 carries a kicker actuating means, preferably in the form of a pneumatic cylinder 163, as is shown in FIG. 1. This pneumatic cylinder 163 is of the double-action type with pressurized fluid being alternately fed to opposite ends on opposite sides of its piston head by suitable conduit means. Piston rod 167 mounted to the piston head of the pneumatic cylinder 163 is connected by a knuckle to a lever arm fixed to the pivoted kicker 161. Thus, when pressurized air is supplied to the back end of pneumatic cylinder 163 the rear flap kicker 161 is swung backward and upwardly to its substantially lateral cocked position, shown in full lines in FIG. 1, with the head space of the cylinder in front of its piston head being vented. It will be seen from FIG. 1 that the bottom side of the rear flap kicker 161 is provided with a depending tapered nose 172 having an oblique rear face 173–1 which, when the kicker is swung down to its depending position indicated in dot-dash lines in FIG. 1, is oriented to substantial horizontal position. The cocked kicker 161 is swung down to this position to engage or strike the rear face of an upstanding back flap on the trailing end of the open top of a carton and kick it forward to folded lateral position by reversing the pneumatic connections to cylinder 163 to retract the piston rod 167. When the kicker 161 is swung down the oblique rear face 173–2 of its tapered nose 172 provides a flat lateral bottom surface substantially in the horizontal plane of the bottom surface 146–1 of front flap folding arm structure 146 when swung up, as are indicated in dot-dash lines in FIG. 1. These aligned bottom surfaces of the flap folding arms 146 and 161 maintain the folded front and back flaps in a common lateral plane during forward transport of the carton that effects the folding down of the top side flaps.

The top of the column 75 and 175, which support the head 2 for vertical reciprocation, fixedly support at their top ends a reversing electric motor 174, as is indicated in FIG. 1. The drive of reversing motor 174 is suitably geared to a pair of top drive sprockets 177 and 277 carried by the top ends of the columns 75 and 175. Drive chain 178 is lapped about drive sprocket 177 in the vicinity of the top end of column channel 75 and about the bottom idler sprocket 68, shown in FIG. 3, with opposed ends thereof anchored by suitable means at 179 to a slide 182 riding up and down in channel 76. In similar fashion, a like chain (not shown) is lapped about the far top sprocket 277 and bottom idler sprocket 178, and is anchored in like fashion to a similar slide of reversed form located in channel 176 of column 175 and tied to slide 182 by suitable cross structure to form an elevator carriage for support of the lateral frame member or beam 142 to effect vertical travel down and up therewith. Thus, when the reversing vertical travel motor 174 is driven in one direction the entire head structure 2 is lowered to position its flap folding means above an open top carton at the sensing and flap folding station Y, such as carton 234–1 indicated in FIG. 1, and when driven in the opposite direction will lift this head structure to its initial elevated position, such as that indicated in full lines in FIG. 1.

Maximum limits of up and down motion of the head structure 2 are dictated by suitable limit means, which may be in the form of switch means in electrical circuitry of the reversing motor 174. Such switch means may be of the double-throw type so as alternately to open the energizing circuits of the reversing motor 174 to limit the down and up drive thereof. Such reversing motor control switch unit 186 is suitably mounted on one of the vertical slides 182. Switch unit 186 is provided with a double-action actuating trigger 187 arranged to be abutted in its up and down travel to bottom and top stop collars 190 and 193, fixed upon a vertical control rod 191 supported by bed unit frame ledge 10 and the back edge flange of column channel 75. The bottom stop collar 190 will limit lowering of the head structure 2, so as to assure that no parts thereof will be driven down to jam against any of the bed unit structure should the down energizing circuit of the reversing motor 174 accidentally be closed in the absence of a carton at the sensing and flap folding station, thus being provided as a safety measure.

As will be seen from FIG. 1, the flap folding head structure 142 includes suitable carton side flap folding plows 233 which extend obliquely down in an advance direction while converging toward each other. As is presently known in the art, plows of such shape will gradually turn over and fold down upwardly-extending carton side flaps when the latter are moved forward to engagement of their outside faces against the inner sides of such plows.

Means for stopping each oncoming carton at the flap folding station Y, for performance thereon of the front flap folding operation, thereafter to be withdrawn to permit the carton to be picked up by the chain conveyor and transported forward, may be a pivoted stop paddle structure 225 having a journal 226 through which a transverse pivot pin extends (FIG. 2B). For the purpose of swinging this stop paddle 225 rearwardly up to intercept the carton path and swinging it forwardly down to a retracted position a pneumatic motor is provided which includes a cylinder 227 suitably pivotally supported at its back end 118. The piston structure of this pneumatic motor 227 includes with its piston head a piston rod 230 extending from out of its rearwardly-extending front end for pivoted driving connection to the pivoted stop paddle 225 by means of connector knuckle 232. Thus, when the piston rod 230 is thrust forward, i.e., back toward the entrance end of the machine, it will swing the pivoted stop paddle 25 counterclockwise to lift it up into the carton travel path to constitute a stop for each carton as the latter is moved up by the conveyor means into the flap folding station Y, as is indicated in FIG. 2A. This stop paddle 225 will be retracted out of the carton travel path by clockwise swing forward upon retraction of the piston rod 230.

The initial section of the conveyor 501 is, in accordance with the present invention, in the form of a normally retracted lift carriage. This lift carriage 501 is normally in a downwardly-retracted position so that its top structure is depressed below the line of forward travel of an entering contents-loaded carton and the path of advance or forward travel thereof laterally through the base or bed unit 1. Upon entry of a filled carton from the feeding roller conveyor 9 over the retracted or depressed gate 12 the leading end of the entering carton deactivates the photocell 138 to cause closure of the relay switch controlled thereby so as to close a circuit of a solenoid valve for energization of the latter to supply pressurized fluid to a pneumatic motor for raising up gate 12 to close same. The top structure of the retractable lift carriage 501, as will be seen from FIGS. 2A, 4, 5 and 6, has a frame including a pair of longitudinally-extending and transversely-spaced vertical side plates 502 and 503 fixed together by tie rods 504 and 505. The top structure of the lift carriage 501 is defined by a transversely-extending driven entrance roll 506 and a plurality there-following of transversely-extending driven rolls 507 and 507–1, longitudinally spaced apart and with the tops thereof aligned in a substantially horizontal plane coinciding with the path of forward travel or advance of the cartons. The entrance roll 506 has fixed thereto a driving spur gear 508 and the rolls 507 and 507–1 each has fixed to its near or operator end a driving spur gear 509, as will be understood from FIGS. 4, 5 and 6. The inner face of the carriage side plate 502 also supports stub shafts on which are rotatably mounted a plurality of idler gears 510 (FIGS. 5 and 6). As will be best understood from FIG. 5 a continuous chain, indicated in dot-dash lines 511 is trained about the spur gears 508, 509 and 510 and is also lapped about a driven spur gear 512 (FIGS. 4 and 5) for rotating these transport rolls in a clockwise direction as viewed in FIG. 5. The driven spur gear 512 is fixed to a rotary hub 513 which, in turn, has fixed thereto a driving spur gear 514 that is to be constantly driven during activation of the machine from the main motor 51 thereof.

For the purpose of lifting and downwardly-retracting the conveyor carriage 501 the bed unit 1 of the machine is equipped with a pair of longitudinally-spaced transverse shafts 515 and 516 suitably supported between the bed sidewalls 5 and 6 by journals 517. On opposite ends of each of the cross shafts 515 and 516 are fixed a pair of hubs 518 each carrying a crank arm 519. The free ends of the pair of crank arms 519 which are thus fixed to the cross shaft 515, and those which are similarly fixed to the cross shaft 516, are respectively pivotally connected to tie rods 504 and 505, so that when these cross shafts 515 and 516 are rotated counterclockwise through a small angle the carriage 501 is lifted and, conversely, when such cross shafts are rotated counterclockwise back in the opposite direction the carriage is retracted downwardly.

In order to effect this alternate lift and lowering of the conveyor carriage 501 the far ends of the cross shafts 515 and 516 have fixed thereto hubs 520 with that carried by cross shaft 515 carrying an arm 521. The hub 520 fixed to cross shaft 516 carries an arm 522 which is similar to arm 521, but forms a section of an elongated arm having another end 523 extending upwardly in the diametrically opposite direction. The arms 521 and 522 have their free ends pivotally connected to a tie bar 524 and the free end of the arm 523 is pivotally connected to a piston rod 525, with the latter being reciprocated by pneumatic motor 526 having its opposite end pivotally supported by a bracket 527 fixedly carried, for example, by bedside plate 6. Thus, when pressurized air is supplied to the cylinder of pneumatic motor 526 its piston rod 525 is extended, as is indicated in FIGS. 4 and 5, to swing the arms 519 upwardly in a clockwise direction for lift of the carriage 501. Conversely, when the pressurized air is exhausted from the cylinder of pneumatic motor 526 its piston rod 525 is retracted thereinto to swing the arms 519 downwardly in a counterclockwise direction to retract or lower the carriage 501.

A sleeve 528 is supported for free rotation on cross shaft 516 and carries a pair of gears 529–1 and 529–2 fixed on opposite ends thereof. Chain 42, which is driven by the machine motor 51, is lapped about gear 529–1 for constant drive of gears 512 and 514 through an endless chain 514–1 lapped about gears 514 and 529–2.

In FIG. 5 is shown in broken lines the carton stop paddle 225 for determining the relative position of the carriage 501 immediately in front thereof.

As will be understood from FIGS. 2A, 3 and 7 to 11 incl. the clamping and guide rails 80A and 180A are elongated, transversely spaced apart members which extend substantially parallel to the path of travel of the cartons through the machine bed unit 1 from a vicinity a short distance beyond the entrance gate 12 to a point beyond the upright columns 75 and 175 of upright structure 3 which supports the elevator head unit 2. These guide rails 80A and 180A have transversely-spaced apart, opposed inside edges 81A and 181A. As is detailed in the above-identified parent Patent No. 3,382,645 these opposed inner sides of such clamping rails are designed to be spread apart fully each time a closed carton is cleared through the base unit of the machine for reception therebetween of the next oncoming carton and, when this carton is then stopped by the stop paddle 225 at the sensing and top flap folding station Y in the position 234–1, they are to be moved transversely toward each other to be brought to abutment of the opposite sidewalls of the pausing carton momentarily to clamp the latter in such pausing position, and then, upon release resulting from retraction of the stop paddle, to be biased by reduced pressure to abutment of these opposite carton sidewalls to serve as carton guides.

It will be noted (see particularly FIGS. 10 and 11) that the opposed inner sides 81A and 181A of these guide rails are each equipped with a depending flange 530 which is bent inwardly beneath this rail to an oblique position for support thereagainst of a plurality of freely running rollers 531, the axes of which extend obliquely forward and down toward those of the other rail. Additional rollers of this type 531–1 are also provided, but are foreshortened for clearance purposes hereinafter explained. The two sets or pairs of series of longitudinally-spaced oblique rollers 531 and 531–1 carried respectively on the inner sides 81A and 181A of the pair of guide rolls 80A and 180A thus provide support surfaces which are arranged at oppositely directed and downwardly-extended oblique angles to the transverse plane of the carton path of travel in which the infolded leading and trailing bottom end flaps of each oncoming carton is disposed. Since an initial section of these two series of rollers 531 are to be moved inwardly toward each other with the clamping rails 80A and 180A that support them and these are mounted opposite the sides of the lift carriage 501 they are so located with respect to the longitudinally-spaced transverse carton support rolls 507 and 507–1 of the latter as to be receivable in the spaces intervening these rolls as the carriage is raised, as will be best understood from FIG. 2A. The lower tip ends of these oblique rollers 531 will be located appreciably below the tops of the transport rolls 507 so that, as the clamping and guide rails 80A and 180A are moved transversely inward toward each other, these lower tips of the oblique rollers will be nosed in under or inserted beneath the sidewalls of the oncoming carton and the hinge lines of the bottom side flaps thereof. Accordingly, when the lifted conveyor carriage 501 is retracted downwardly after the carton has passed forward therebeyond, as permitted by retraction of the stop gate 225 and simultaneous easing of the clamping action of the rails 80A and 180A, the carton is thereafter supported along its bottom side edges upon these two series of oblique rollers 531 and 531–1 for forward transportation past the adhesive-applying equipment to the means for holding the refolded side flaps up in their lateral positions while the inserted adhesive sets.

It is to be understood that such forward transportation of the carton from the sensing and top flap folding station Y in front of the raised stop paddle 225 is effected in the manner fully described in the above-identified parent Patent No. 3,382,645 by the chain conveyor comprising the endless chains 59 and 159 and the cross flight 64–1 or 64–2 thereof, as has been previously indicated. Further, the inward movement of the clamping and guiding rails 80A and 180A to opposite sides of each carton as it is stopped at the sensing and flap folding station Y and the subsequent outward movement thereof away from each other for reception therebetween of the next oncoming carton is effected by similar equipment operated in a similar manner to that disclosed in this parent application. For the latter purpose, as will be understood from FIG. 2A, the double-ended pneumatic motor 87 may be employed with its double-ended piston 89 equipped with endless chain 99 and the various sectional runs thereof which are lapped about the rollers 90, 91, 92, 93, 94, and 95 and with connection or clamping of runs of this chain to guide rail 80A by connectors 300, 400, 700, and 800, and to guide rail 180A by connectors 100, 200, 500 and 600. By feeding relatively high pressure air to the pneumatic motor 87 the rails 80A and 180A are caused to serve as clamping rails for holding the carton firmly at the station Y; and by then feeding relatively low pressure air thereto these clamping rails are converted to guide rails.

With the load of the action transferred along the hinge lines of the infolded bottom side flaps (indicated at 532 in FIG. 11) from the conveyor carriage 51 to the initial sections of the two series of oblique rollers 531 in the above manner the lowering retraction of this carriage permits the opposed free ends 533 of these side flaps to drop down through the oblique angles intervening the infolded bottom end flaps (538–1 and 538–2, FIGS. 11, 17, 18 and 21) and these side flaps, so that the outer faces of these side flaps rest upon the oblique rollers. As a result, the opposed ends 533 of the bottom side flaps 532 become spaced apart to provide an intervening gap through which nozzle structure may be inserted as the carton travels forward. It will be noted from FIGS. 1 and 2A that suitable adhesive applying head means or bottom and top nozzles 535 and 536 are respectively mounted in the bed unit 1 and on the elevator beam 142 in about the positions there shown. The bottom adhesive-applying nozzle 535 is mounted in an elongated plow structure 537 shown in FIGS. 2A, 2C and 3. This plow structure 537 embodies a plow tip to assure maintenance of the gap between the free ends 533 of the obliquely depending bottom side flaps 532 and allow free entry of the bottom spray head or nozzle 535, a narrow support rail to maintain the infolded bottom end flaps 538–1 and 538–2 fully up in their lateral positions, and finally side plow means to refold the obliquely depending bottom side flaps 532 upwardly to the abutment of their inner faces against adhesive carrying lower faces of the infolded bottom end flaps.

The plow structure 537 has a tip section 540 preceding the spray head 535, with this tip section including a relatively narrow, triangular plate 541 provided with an oblique top edge 542 which gradually rises forward to an oblique triangular plate 543 having its point extending rearward. This plow tip 540 provides lead-in means to assure entry of the spray head 535 between the downwardly-depending free ends 533 of the bottom side flaps 532. Beyond or forward of the spray head 535 is provided a forwardly-extending, elongated and upstanding narrow plate 544 which provides a lateral narrow top edge 545 upon which the lower faces of the leading and trailing bottom end flaps 538–1 and 538–2 will bear in a central zone thereof to assure maintenance thereof in their fully infolded horizontal positions. It will be seen from FIG. 11 that the liquid adhesive delivered by the spray head 535 is applied in two zones flanking a central zone 546 which is kept free of adhesive so as not to foul up this top edge 545 of plow plate 544. The elongated upstanding plate 544 is flanked on opposite sides of its base by a pair of lateral flanges 547–1 and 547–2. As will be seen from FIGS. 2C and 3 these lateral flanges are provided with gradually rising, upturned forward end sections 548–1 and 548–2, so that after the liquid adhesive is supplied to longitudinal flanking zones of the lower faces of the carbon bottom end flaps 538–1 and 538–2 the free ends 533 of the side flaps 532 will engage these oblique surfaces to be gradually raised to abutment of the adhesive-carrying lower faces of these infolded bottom end flaps.

In further forward travel of the carton its closed bottom is then delivered to suitable flap-maintaining or pressure-applying means to hold the infolded side flaps 532 in abutment with the infolded end flaps 538–1 and 538–2 until the inserted adhesive sufficiently sets to maintain the anchorage of the lapped flaps. It will be understood from FIGS. 1 and 3 that the pressure-applying means mounted in the base unit 1 of the machine preferably consists of a plurality of freely rotatable transverse rollers 550–1 and 550–2 over which the carton bottom will be transported by the terminal end section of the chain conveyor 59–159, for ultimate delivery over the discharge end 8 of the machine bed unit to suitable receptive conveyor means, such as a plurality of freely rotatable delivery rollers 551.

The elevator head beam 142 is equipped with similar means to apply pressure down upon the infolded top side flaps of the closed carton, in opposed relation to such means in the machine bed unit. It will be understood from FIG. 1 that such means may be in the form of a forward, lateral extension 143–2 of head beam 142 carrying similar freely rotating transverse rollers 552 which are mounted in opposed relation to rollers 550–1 and 550–2 in the bed unit.

As has been previously explained in our prior Patent No. 3,236,022 of Feb. 22, 1966 and the above-identified parent application Ser. No. 514,943, when the first carton was delivered over the initial conveyor section (now in the form of lift carriage 501) to the position 234–1 at the sensing and flap folding station Y it intercepted the beam of light emanating from source 141 to deactivate the photocell 140, as will be apparent from FIG. 1. As a result, a pair of photocell switches were manipulated to close a normally opened one thereof (140–1, FIG. 16) and to open a normally closed one thereof (140–2, FIG. 16). Consequently, the closure of switch 140–1 effected energization of a "Down" relay coil (2540, FIG. 16) through normally closed lower limit switch 186–1 and a held closed head switch (149–2, FIG. 16). As a result, the elevating motor 174 was energized by closure of switches (254, FIG. 15) in its lowering circuit to cause the flap folding head assembly 2 to descend to the top of the open-top carton pausing before the lifted stop paddle 225. The depending pivoted front top flap folding arm 146 was thus brought down over the latter to infold it rearwardly to the top of the carton with simultaneous upswing of this flap folding arm to a horizontal position so as to release trigger 148 of the head switch 149 thereby causing one of its switches (149–2, FIG. 16) to drop open and deenergize the "Down" relay 2540, to stop the descent of the elevator head 2 with the lower portion thereof abutted against the top of the carton and its infolded top end flap to sense the height of the carton.

The delivery of the carton across the top of the raised carriage 501 to abutment of the raised stop paddle 225 caused the far sidewall of the oncoming carton to trip the trigger of a normally closed back flap kicker control switch 128A and hold it open while the carton is pausing at the sensing and flap folding station Y. With the freeing of the head switch 149 as the elevator head 2 was brought down to abutment of the top of the pausing carton one of its held open switches (149–1, FIG. 16) was permitted to close to effect energization of a relay (2960, FIG. 16) to cause the latter to close its switch 296–1 and open its closed switch 296–2. Consequently, solenoid valve 195 was de-energized by opening of switch 296–2 while solenoid valve 194 was maintained in energized condition by the holding closed of the photocell 140–1 to cause the clamping and guide rails 80A and 180A to be moved inwardly to opposite sides of the pausing carton for firmly clamping it in pausing position at the station Y.

Since solenoid valve 195 also controls the operation of the stop paddle 225 by its pneumatic cylinder 227 this stop paddle is thus retracted from in front of the leading end of the pausing carton to ready the mechanism for permitting further forward travel of the carton from station Y upon release from the clamping side rails 80A and 180A when converted to guide rails. The release of the head switch 149 by the lowering of the elevator head 2 also permitted closure of another one of its switches (149–3, FIG. 16) to ready solenoid valve 198 (FIG. 16) for energization. The closure of the relay switch 296–1 by energization of relay coil 2960 caused energization of the relay coil 3410 (FIG. 16) to close its holding switch 341–1, and to close the conveyor high power switch 341–3 while opening its low power switch 341–2 (FIG. 15). The chain conveyor 59–159 is thus driven under full or high power to carry the released carton forward from the station Y.

As the carton is carried forward under full power drive of the chain conveyor its trailing end drags past the sensing switch operating arm or trigger 129A to free it beyond the trailing or back end edge of the far sidewall of the carton, so as to release switch back flap kicker control 128A to its closed position for energizing the kicker solenoid valve 198. Energization of kicker valve 198 caused its pneumatic cylinder 163 quickly to swing down the back flap kicker 161 to infold forward the upstanding back flap of the carton top. Thus the front and back end flaps of the carton top are infolded to ready them for application to their upper faces of liquid adhesive from top spray head 536 so that as the bottom spray head 535 applies adhesive to the lower faces of the infolded bottom end flaps the top spray head performs the same operation with regard to the infolded top end flaps. Plow rails 233 mounted on the elevator head 2 then effect closure of the upstanding side flaps of the top of the carton so that their inside faces are abutted to the adhesive-carrying upper faces of the infolded top end flaps. Further forward transport of the carton by the chain conveyor 59–159 over the pressure applying rollers 550–1 and 550–2 in the bed of the machine causes like pressure to be applied to the infolded side flaps of the top of the carton by the pressure applying rollers 552. The time it takes the carton to proceed between such bottom and top pressure applying rollers 550–1, 550–2 and 552 is sufficient to permit the inserted liquid adhesive to set up enough for secure anchorage of the infolded side flaps to the adhesive-carrying infolded end flaps located interior thereof, for holding such flaps in their lapped positions as the carton is then discharged from the machine.

It will be seen from FIGS. 7 to 10 inclusive that, in accordance with the present invention, the clamping and guide rail 180A on the far or machine side carries a plurality of adhesive-applying control elements or devices, such as a plurality of control switches, in addition to the top back flap kicker control switch 128A. In the embodiment shown therein such additional control switches 555, 556, 557 and 558, may be of the microswitch type. These switches 555 to 558 inclusive are equipped with triggers 559, 560, 561 and 562 with the tip ends thereof carrying rollers to engage the far sidewall of the carton which is being moved forward by the chain conveyor 59–159 beyond the retracted stop paddle 225 while the opposed guide rails 80A and 180A are serving as guides. The roller-tipped triggers 559 to 562 inclusive extend through an elongated, longitudinally-extending slot 563 in the inside face 181A of the rail 180A for such engagement. This slot 563 is of sufficient length as to permit the mentioned longitudinal adjustment for accommodating cartons of various widths within the range that the machine is designed to handle.

Preferably, the microswitches 559 to 562 incl., as well as back flap kicker control switch 128A, are mounted on the underside of the guide rail 180A by suitable means. For this purpose a pair of rack rods 564 and 565 are provided, being slidably supported through suitable guide and mounting brackets 566 and 567. The rack rods 564 and 565 are provided with opposed rack toothed sections 568 and 569, respectively. A toothed pinion 570 is fixed upon a shaft 571 suitably supported to the underface of the guide rail 180A by supporting journal means 572, with the teeth of this pinion being meshed on diametrically opposite sides with the rack teeth 568 and 569. The shaft 571 carries, fixed thereto, a chain sprocket 573 about which is lapped a mid-section or bight 574 of a link chain 575. As will be best understood from FIGS. 9 and 10 bracket means 576 which support such rack bar driving mechanism to the underside of the guide rail 180A also carries a pair of idler sprockets 577 about which end sections of the chain 575 are lapped beyond the bight lapped about the drive sprocket 573. It is indicated in FIG. 3 that the opposite ends 578 and 579 of the chain 575 are connected to fixed structure of the machine bed unit 1, such as respectively to the sidewalls 5 and 6 thereof. Thus, with the clamping and guide rails 80A and 180A spread fully apart, as is indicated in FIGS. 2A and 3, for reception therebetween of an oncoming carton, as it enters over the retracted entrance gate 12 to the lifted conveyor carriage 501, the rack bar 564 will be in its most rearward position, i.e., nearest the entrance end of the machine, for thrust forward, and the rack bar 565 will be in its farthest forward position toward the discharge end of the machine for retraction.

Each of the microswitches 128A and 555 to 558 incl. is provided with a glide and supporting block 850, indicated at 584 in FIG. 10 for switch unit 558. Kicker control switch unit 128A is supported on the rack bars 564 and 565 by such a block 580 and switch units 555 to 558 incl. are supported respectively by such blocks 581, 582, 583 and 584. As is indicated in FIG. 10 with respect to support block 584 it has a transverse hole 585 extending therethrough, which is of larger diameter than the rack rod 564 for ready glide of the latter therethrough. This block 584 also is split at the opposite end to provide a clamp 586 for clamping this block to the rack rod 565 while it has free running slide on rack bar 564. Conversely, control switch unit 555 is clamped by its support block 581 on rack bar 564 and has free running glide on rack bar 565. The two control switch units 556 and 557 are slidably mounted in slot 587 and fixed by their support blocks 581 and 582 to the underface of the guide rail 180A. Thus each of the support blocks 582 and 583 is provided with a pair of oversized transverse holes through which the rack bars 564 and 565 will glide. The support block 580 for the kicker control switch unit 128A is clamped upon the rack bar 564 and slides freely on rack bar 565.

As will be seen from FIG. 9 brackets 125–1 and 252–2 support the ends of a pair of longitudinally-extending, parallel guide rods 126 and 226 to the underside of the guide rail 180A. A carriage 127 is slidably supported by the guide rods 126 and 226, and this carriage pivotally supports a bell crank 588 with one arm thereof carrying, as the trigger tip 129A, a roller which extends through a longitudinal slot 589 in the inner side 181A of the guide rail 180 (see FIGS. 8 and 9). The carriage 127A is tied by a thrust and pull rod 589 to rack bar 564 by a suitable connecting clamp 590, for translation along the guide rods 126 and 226 with longitudinal translating of this rack bar. The other arm of the bell crank 588 is tied by a strap 591 to switch operator 592, so that when the roller-equipped tip 129A of the bell crank 588, acting as a trigger for the kicker control switch 128A, is depressed by the far sidewall of the carton this control switch will be held in open position.

Accordingly, if the carton is wide, so that its top flaps may be long to extend upwardly an appreciable distance the kicker control switch unit 128A will be located appreciably back toward the entrance end of the machine, i.e., only a short distance forward of its initial retracting position illustrated in FIG. 2A. Narrow cartons, which cause the guide rails 80A and 180A to be driven inward toward each other an appreciable distance cause the kicker control switch 128A and its trigger 129A and the carriage 127A for the latter to be advanced farther forward. The relative position of parts shown in FIGS. 7, 8 and 9 are those effected by considerable transverse inward movement of the guide rail 180A to the sidewall of a carton of relatively narrow width wherein the group of switch units 128A, 555, 556, 557 and 558 have been crowded more closely together, with forward adjustment of the trigger carriage 127A and the bell crank trigger 129A for operating the switch unit 128A. It will be noted that the spacing between switch units 128A and 555 is maintained constant since these are clamped upon the same rack rod 564; also the intermediate switch devices 556 and 557 remain constantly spaced due to their preset positioning in slot 587 and the fixed mount of these switch units to the underside of the guide rail 180A. Of the group of four switches 555, 556, 557 and 558 which control application of adhesive to the lower faces of the infolded leading and trailing bottom end flaps 538–1 and 538–2 these may be considered to be first, second, third and fourth adhesive-applying control switches, with the first switch movable longitudinally farther away or back from the second switch when the guide rail 180A is retracted toward the far or machine side 6 of the bed until 1 and, similarly, the fourth switch also being movable farther away or forward from the third switch. As such guide rail 180A is moved inward toward the opposed guide rail 80A the first switch moves forward toward the second switch and the fourth switch moves backward toward the third switch.

Since the delivery of liquid adhesive to the upper faces of the infolded top end flaps is to be performed simultaneously with such application of the lower faces of the bottom end flaps the delivery and stoppage of spray of liquid adhesive from the top spray head 536 and the bottom spray head 535 may be controlled by single means associated with the means for delivering liquid adhesive thereto. However, since electrical circuitry control of delivery and stoppage of flow of liquid adhesive from such separate spray heads may be attained more rapidly by control of separate supply systems therefor the electrical circuitry of the machine preferably is equipped with separate solenoid valves (5350 and 5360) to effect these independent flow controls, as will be understood from the schematic wiring diagram of FIG. 16 and the following recital of a typical operation of the machine when equipped with the present adhesive-applying mechanism. Further, while it is possible to employ a single solenoid valve (195, FIG. 16) to dictate transverse adjustment of the guide rails 80A and 180A relative to each other and for raising and lowering of the stop paddle 225, as well as for the lift and retraction of the conveyor carriage 501, the later is controlled in its elevating movement in a present embodiment of the machine by a separate solenoid valve (5260, FIG. 16).

In the diagrammatic and schematic views of FIGS. 18 to 28 incl., wherein the application of adhesive to the lower faces of the infolded leading and trailing bottom end flaps 538–1 and 538–2 is depicted by way of example, the four adhesive-applying control switches 555, 556, 557 and 558 are, for convenience, identified therein respectively by the reference characters A, B, C, and D with their triggers being respectively identified by the reference characters (a), (b), (c) and (d), and with the bottom spray head 535 being represented by an arrow S. The areas of the lower faces of the infolded bottom end flaps 538–1 and 538–2 to which adhesive is applied by such spray head 535 are indicated respectively as X–1 and X–2. Since all closing flaps at the end of a carton are of the same length due to conventional manufacturing procedure and when the side flaps 532 are to be of the opposed abutment type wherein there is no overlap of each other the end flaps 538–1 and 539–2 will be of the same length as the side flaps, as is illustrated in FIG. 17. Thus the width of a carton so equipped with such closing flaps is a controlling factor in the application of adhesive to lower faces of the end flaps when it is to be confined thereto rather than to be the undesirably permitted to be applied to the bottom of carton contents exposed between the free ends thereof.

In referring to FIGS. 18 to 28 incl. let it be assumed that the first and fourth switches A and D are of the normally closed type to be triggered open, and that the second and third switches B and C are of the normally open type to be closed by triggering. These switches will then be connected in two parallel circuit branches 595 and 596 between a power supply conductor 597 and a conductor 598 connected to the ground side of the circuitry N (FIG. 19). Solenoid control valve 5350 which initiates and stops delivery of liquid adhesive from the bottom spray head 535 (and which may if desired, perform the same function for the top spray head 536) is inserted in the conductor 598, as is indicated in FIG. 19. When separate solenoid valves are employed for respectively controlling delivery of liquid adhesive from the respective bottom and top spray heads 535 and 536 these may be inserted in separate parallel conductors 598–1 and 598–2 connecting the parallel control switch circuits to the neutral side N of the circuitry and cross connected by conductor 598–3 (see FIG. 16). It is also indicated that this additional circuit arrangement involves connection of the power supply side of the parallel control switch circuits 595 and 596 by the conductor 597 to a point intervening the head switch 149–1 and the relay coil 2960 (see FIG. 16). The separate solenoid valve 5260 for dictating lift and retraction of the conveyor carriage 501 is shunted around the solenoid valve 195 for simultaneous energization and deenergization thereof.

FIG. 18 depicts approach of a loaded carton 234–1 toward the group of four switches A, B, C and D and their respective triggers (a), (b), (c) and (d). As the leading end edge of the far sidewall of the moving carton, in its forward transport, depresses the trigger (a) to open switch A nothing hapens, and this is also true when the trigger (b) of switch B is depressed by such carton sidewall contact. However, as the trigger (c) is depressed by contact with the oncoming leading edge of this carton sidewall control switch C is closed. Since control switch D is normally closed solenoid valve 5350 becomes energized through this switch and control switch C, as is indicated in FIG. 22. The energization of solenoid 5350 causes the spray head S to begin delivering liquid adhesive to the lower face of the infolded bottom end flap 538–1 a short distance back of its leading hinge end as is depicted in FIG. 20. With further advance of the carton relative to the four control switches, as is indicated in FIG. 23, trigger (d) becomes depressed by contact with the leading edge of the far carton sidewall to open the control switch D. As a result, the solenoid valve 5350 becomes de-energized to terminate delivery of adhesive from the spray head S, after the adhesive has been applied through the area X–1 which terminates short of the free end of the infolded end flap 538–1, as is indicated in FIG. 23. No additional delivery of liquid adhesive from the spray head S is made until the carton further advances to bring the spray head S opposite the lower face of the infolded end flap 538–2 a short distance back of its free end, as is illustrated in FIG. 25. At that instant the trigger (a) is freed from the back end edge of the far sidewall of the carton now to effect closure of the control switch A. Thus an energizing circuit is completed through control switches A and B, as is indicated in FIG. 26, again to energize the solenoid valve 5350 for again starting delivery of liquid adhesive from the bottom spray head 535 a short distance back of the free end of infolded end flap 538–2. This spraying action is continued until additional carton advance, depicted in FIG. 27, frees the trigger (b) from behind the back edge of the far carton sidewall, so as to open the control switch B. Since both parallel circuits which includes the four control switches A, B, C and D are now open, as is indicated in FIG. 28, delivery of liquid adhesive from the bottom spray head 535 is terminated short of the hinge line of the infolded bottom end flap 538–2 after application of adhesive to its lower face throughout the area X–2. It is to be understood that, as is indicated above, if a separate solenoid valve 5360 is employed to dictate the same spraying action for the top spray head 536 rather than to have the solenoid valve 5350 perform this function for both spray heads the same spraying action will be dictated by the second solenoid valve 5360 with respect to the top spray head.

If it is desired to employ "hot melt" liquid thermoplastic adhesive rather than wet glue for insertion between the infolded end flaps and the infolded side flaps one may substitute an applicator head of the type illustrated at 599 in FIG. 12 for the wet glue spray head 535. The hot melt applicator head 599 features two flanking sets of orifices 601 and 602 with an intervening central zone 603 thereof having no delivery orifices, so that the hot melt adhesive is delivered in the flanking zones to side zones of the infolded end flaps while keeping a central zone thereof free of adhesive to avoid fouling up flap guiding equipment, such as the top edge 545 of the rail 544 (FIG. 2C).

Since the mechanism of the present invention is designed to permit the carton closing machine and the adhesive-applying mechanism thereof to operate on very narrow cartons provision must be made for causing the oblique support rollers 531 and 531–1 to be nosed in under the hinge lines and sidewalls of such narrow cartons without interference with other equipment. It will be seen from FIG. 2B that the stop paddle 225 is provided with a relatively narrow shank 605 to define between this shank and its relatively broad head side notches 606 into which the tip ends of any of the opposed oblique rollers 531 may reach in the insertion beneath sidewalls of the narrow carton without interfering with the action of the stop paddle equipment. The stop paddle is also medially provided with a slot 607 for reception of the top edge 542 of the triangular plow plate 541 in the retraction of the stop paddle. Also, opposite the stop paddle and the path of its swinging action the oblique rollers 531–1 have been foreshortened for the like purpose of preventing interference, and the oblique rollers 531–1 opposite the spray head 535 have been foreshortened for a similar reason.

As will be seen in FIGS. 13 and 14 lugs 266–1 and 266–2 carried by the far conveyor chain 159 are of appreciable length. These lugs 266–1 and 266–2 are provided for successively engaging beneath roller 237 on the tip end of trigger 236 which manipulates a second limit switch device 235, the latter being biased to one condition of circuit control and when its trigger is tripped upwardly by either of such lugs carried therebeneath to manipulate it to another condition of circuit control. These lugs 266–1 and 266–2 are of the appreciable length shown so that the second condition of circuit control effected by the tripping may be maintained for a proper time release. The relative positions of the pair of limit switch tripping lugs 66–1 and 66–2 with respect to tripping lugs 266–1 and 266–2 are shown therein by the bracketing of the positions of the former (not viewable in FIGS. 13 and 14) for an understanding of the relative timing of the operations of the limit switch devices 135 and 235, respectively controlled by the switch tripping lugs 66–1 and 66–2 on the conveyor chain 59 and the switch tripping lubs 266–1 and 266–2 carried by the conveyor chain 159. The operations illustrated in FIGS. 13 and 14 and the actions dictated thereby are here explained in connection with the operational details described with reference to the circuitry shown in FIGS. 15 and 16.

As is illustrated in FIG. 15 the electrical circuitry of the machine, shown by way of example in the accompanying drawings, includes AC power supply lines L1, L2 and L3, to which are connected in parallel circuits to supply such power to main motor 51 and AC reversing starter switches 253 and 254 of the vertical motion motor 174. Starter switches 252 are closed by energization of a relay coil 2520 (FIG. 16). The "Up" starter switches 253, which dictate drive of motor 174 in one direction for the lift of the elevator head 2, are closed by energization of a relay coil 2530 (FIG. 16), and the "Down" starter switches at 254, which dictate reversed drive of this motor for lowering the head, are closed by energization of relay coil 2540 (FIG. 16). A brake coil 255 is associated with motor 174 to hold it in stopped position. A rectifier circuit 256 for converting AC power to DC energy supplies the latter to magnetic brake 67–1 and magnetic clutch 67–2 through parallel circuits between conductors 342 and 343 thereof, and these parallel circuits are alternately closed. The circuit of the magnetic brake 67–1 includes a biased-closed switch 256–1 and the circuit of the magnetic clutch 67–2 includes a biased-open switch 256–2, and these switches are tied together for simultaneous alternate opening and closing by a relay coil 2560 (FIG. 16). Since relay coil 2560 is initially de-energized, the brake circuit switch 256–1 remains closed with the brake applied to the drive of the chain conveyor 59–159. In the illustrated machine it is desirable to connect the clutch switch 256–2 to conductor 342 alternately through a voltage reducer 344 and a full voltage line 345 respectively by means of a normally closed switch 341–2 and a normally open switch 341–3 tied together for simultaneous manipulation.

The electrical circuitry of the machine also comprises a photocell system 1380, which includes the photocell 138 in the vincinity of the entrance selector gate 12 and a light source 139 arranged on the opposite side of the machine for directing a photocell exciting beam upon this photocell (see FIGS. 1, 2, 13 and 14), and a photocell system 1400, which includes the photocell 140 at the sensing and flap folding station Y and its exciting light source 141 on the opposite side of the machine (see same figures). The energizing circuit for the photocell systems 1380 and 1400 includes a normally open switch 262–1 (FIG. 15) which is to be closed by energization of a relay coil 2620 (FIG. 16).

As will be seen from FIG. 16 the first parallel circuit thereof, extending between power supply line L3 and the ground line N, consists of a conductor 355 in which is inserted the "Uniform-Random" switch 259, for closure to handle a group of random size cartons, and relay coil 2620. The second parallel circuit 356 has inserted therein chain conveyor operated switch 235–2 which is biased to closed position, closed relay switch 266–1 and the entrance gate-operating solenoid valve 197. The third parallel circuit 357 extends from a point of connection to circuit 356 between switches 235–2 and 266–1 to the neutral line N and has inserted therein the initially open relay switches 262–2 and 266–2, and relay coil 2660 for operating the latter pair of switches. Parallel circuit 358 constitutes a machine running circuit having therein a closed push button "STOP" switch in series with a normally open push button "RUN" switch 263, to be pushed closed for initiating operation of the machine, and relay coil 2520. Parallel circuit 359 is connected to circuit 358 between the "STOP" and "RUN" switches and the neutral line N, having therein in series an overload switch 265, a holding switch 252–4, normally closed back top flap kicker sensing switch 128A, normally open head switch 149–3, and back flap kicker solenoid valve 198. Circuits 358 and 359 are cross-connected from a point beyond switch 263 to a point between switches 252–4 and 128A. A loop circuit 360 has its end legs 361 and 363 connected to the neutral line N, with leg 361 including open chain conveyor operated switch 135–1, which is biased toward closed position, and relay coil 2560. A cross-connection is effected between circuit 357 and loop circuit leg 361 by a conductor 362 having in series therein normally open photoswitch 138–1, normally closed photoswitch 138–2, and closed chain conveyor operated switch 135–4 which is biased toward open position. A bridge 366 is connected across between circuit 357 from a point beyond relay switch 266–2 and conductor 362 at a point between the photocell switches 138–1 and 138–2. The other leg 363 of the loop circuit 360 has in series therein open head switch 149–1 which is biased toward closure, and relay coil 2960. An intermediate leg 364 of loop circuit 360 includes normally open relay switch 296–1 and relay coil 3410. A bridge conductor 365 is shunted around relay switch 296–1 and includes in series open conveyor operated switch 135–3, which is biased toward closed position, and normally open relay switch 341–1. A bridge 367 connects the loop leg 363 to the circiut 359 respectively ahead of the head switch 149–1 in the former and sensing switch 128A in the latter, and includes a normally open relay switch 262–3. Circuit 368 is connected to circuit 359 between switches 252–4 and 128A and neutral line N, and includes therein in series open relay switch 262–4, closed relay switch 296–2, closed chain conveyor operated switch 235–1, which is biased toward closed position, and stop gate operating solenoid valve 195. Circuit 370 is connected by conductor 369 to circuit 368 at a point beyond switch 235–1 through normally closed chain conveyor operated switch 435–1, which is biased to closed position, and includes in series therein open photoswitch 140–1, closed head switch 149–2 which is biased toward open position, closed bottom elevating limit switch 186–1 which is biased to closed position, and "Down" relay coil 2540. Switches 149–2, 186–1 and relay coil 2540 in circuit 370 are shunted by a bridging conductor 371 which has therein rail operating solenoid valve 194. Parallel circuit 372 is connected through open switches 275 and 273, open top elevating limit switch 186–2 which is biased toward closure, and "Up" relay coil 2530, to neutral line N. A bridge 373 is connected between conductor 369 ahead of photoswitch 140–1 and circuit 372 at a point between switches 273 and 186–2, and includes photoswitch 140–2 and closed switch 272 in series.

Conveyor chain operated switches 235–1 and 235–2 are ganged together for simultaneous operation. Relay switches 262–2, 262–3 and 262–4 are ganged together and to switch 262–1 which energizes the photocell units 1380 and 1400 of the top portion of FIG. 15 for simultaneous operation. Relay switches 266–1 and 266–2 are ganged together similarly. Photoswitches 138–1 and 138–2 are ganged together for like purpose. Relay switches 296–1 and 296–2 are ganged together similarly. Conveyor chain operated switches 135–1, 135–3 and 135–4 are ganged together for simultaneous operation. Relay switch 341–1 is ganged together with low power relay switch 341–2 and high power relay switch 341–3 shown in FIG. 15. Head switches 149–1, 149–2 and 149–3 are ganged together for simultaneous operation. Photoswitches 140–1 and 140–2 are ganged together for like purpose. Switches 272, 273 and 275 are provided for manual operation to allow ready release of a carton in the machine which is jammed or damaged. The gang of switches 262 are provided to be left open for "Uniform" carton operation.

In accordance with the improvement of the present invention, as has been previously indicated, the circuitry of FIG. 16 is supplemented by added circuitry consisting of a power supply conductor 597 connected between the head switch 149–1 and the relay coil 2960, leading to a pair of parallel circuits 595 and 596 respectively embodying the adhesive-applying control switches 555 and 556, and 557 and 558. Beyond these adhesive-applying control switches the parallel circuits 595 and 596 are cross-connected by a conductor 598–3, and beyond the latter leg 598–1 to neutral includes solenoid valve 5350 and leg 598–2 to neutral includes solenoid valve 5360. These two solenoid valves 5350 and 5360 respectively control the flow of liquid adhesive to the respective adhesive applicators or spray heads 535 and 536.

OPERATION OF PRESENT MACHINE DURING A TYPICAL RUN THEREOF

A typical operation of the herein illustrated carton closing machine embodiment which is equipped with the glue applying mechanism of the present invention may be described as follows with reference to the schematic wiring diagram of FIGS. 15 and 16. The machine is supplied with power to begin the running of the main motor 51 (FIG. 2) and to energize relay 2620 (through manually closed "Random" switch 259) for causing closure of its switches 262–1, 262–2, 262–3 and 262–4. The photocell systems 1380 and 1400 are energized through closed switch 262–1. At the same time lifted entrance gate retracting solenoid valve 197 becomes energized through closed switches 235–2 and 266–1. "Run" push button 263 will be pushed to closed position to energize relay coil 2520 for closure of its holding switch 252–4. A filled carton, such as that indicated at start position Z in broken lines at 234–2 in FIGS. 1, 13 and 14, is supplied, with its bottom end and side flaps folded up to closing horizontal positions on which the load contents rests; and its top end and side flaps extend upwardly in unfolded carton-open positions. This carton is fed forward across the entrance feeding rollers 9 (FIG. 1) to entrance gate 12. Entrance gate 12 was retracted by energization of gate solenoid valve 197 so that the oncoming carton 234–2 passes freely thereover on to the constantly driven rolls 506, 507 and 507–1 of the conveyor carriage 501, which at this time is in its raised top position. These driven carriage rolls 506, 507 and 507–1 then deliver the open-top carton 234–2 forward to abutment of the carton front end against the raised stop paddle 225 (FIGS. 1, 2A and 2B) for stoppage there in the pausing position 234–1 at the sensing and top flap folding station Y while the lifted carriage rolls continue to rotate beneath the pausing carton. During this entrance of the open-top carton 234–2 over the raised retractable carriage 501 such carton intercepts the light beam projected from light source 139 to cut off the impingement of this beam on photocell 138, so as to cause photocell system 1380 (FIG. 15) to effect energization of a relay which closes its switch 138–1 and opens its switch 138–2. Current is thus supplied through closed chain conveyor-operated switch 235–2 and closed switches 262–2 and 138–1 to relay coil 2660 to energize the latter. Energization of relay coil 2660 opens its switch 266–1 and closes its holding 266–2, the opening of its switch 266–1 effecting de-energization of solenoid valve 197 to permit the upwardly-biased gate 12 to rise and momentarily bar entrance of the next oncoming carton from the start position Z.

Since the chain conveyor 59–159 is in rest position with its brake 67–1 holding it the limit control switch 135 is held triggered thereby to hold open its switches 135–1 and 135–3 and hold closed its switch 135–4. Although the oncoming carton, in passing photocell 138 momentarily opened its closed switch 138–2 and closed its open switch 138–1 to energize relay coil 2660, these photoswitches are restored to their original conditions when the forwardly travel carton clears the photocell 138. Now, with relay coil 2660 being maintained energized through its closed holding switch 266–2 to energize relay coil 2560 through again closed photoswitch 138–2 and held closed conveyor limit switch 135–04. Energization of relay coil 2560 opens its brake switch 256–1 and closes its clutch switch 256–2 to release the conveyor brake 67–1 and energize through rheostat 344 the chain conveyor clutch 67–2 at low power. The chain conveyor 59–159 is thus now driven at low power while the carton is pausing behind raised stop paddle 225, to coast its oncoming flight bar 64–1 up behind the pausing carton to abutment of the back end of the latter. The abutted flight bar applies only non-crushing pressure to the pausing carton since the chain conveyor is being urged forward under only low power and this holding is permitted by clutch slippage.

As the oncoming carton moved forward to pause in the position 234–1 behind the raised stop paddle at station Y its leading end entered between photocell 140 and its light beam source 141 to effect opening of photoswitch 140–2 and closure of open photoswitch 140–1. Closure of switch 140–1 effected energization of solenoid valve 194, causing the carton clamping and guiding rails 80A and 180A to be driven toward each other for abutting their opposed inner sides 81A and 181A to the opposite sidewalls of the stopped carton in its position 234–1, thereby centering it under relatively high clamping pressure firmly to hold the carton at station Y while retracting stop paddle 225. Simultaneously, closure of photocell switch 140–1 effected energization of relay coil 2540 through closed elevator switch 149–2 and lower limit elevation switch 186–1 to cause elevating motor 174 to lower the elevator head 2 and its head beam 142 down toward the open top of the carton while the latter pauses in its position 234–1.

Versions of the present machine employ combined hydraulic and pneumatic motor means for lowering and lifting the elevator head 2 and its beam 142 in lieu of the reversible motor 174 and its cable means to effect these operations. For such purpose the hydraulic and pneumatic circuitry for such fluid motor operation may be controlled by a pair of solenoid valves respectively inserted in parallel circuits connected to head switch 149–2, in substitution for relay coil 2540.

As the elevator head 2 is lowered to the open top of the pausing carton in position 234–1 its depending front flap folding arm 146 is lowered over the upstanding front end flap to infold the latter as this arm is gradually swung up to horizontal position shown in broken lines in FIG. 1. This upswing of flap folding arm 146 releases the trigger 148 of the head switch device 149 to open its switch 149–2, thereby de-energizing relay coil 2540 for stopping the descent of the elevator head 2 at the carton top (which constitutes sensing of the height of the carton), and to close its head switch 149–3. The latter head switch controls the back top flap kicker operating solenoid value 198 (if kicker control switch 128A is closed) which controls supply of pressurized air to the kicker swinging pneumatic motor 163, but this does not yet occur since the far sidewall of the pausing carton at position 234–1 is holding retracted trigger 129A to keep open the kicker control switch 128A.

Closure of head switch 149–1 by descent of elevator head 2 to the carton top effects energization of relay coil 2960 through closed switch 262–3 (which was closed by energization of relay coil 2620 at the start) to open its switch 296–2 for de-energizing solenoid valve 195 and to close its switch 296–1 to energize relay coil 3410. The de-energizing of solenoid valve 195 causes reduce pressure to be applied to the clamping rail manipulating pneumatic motor 87 so that now the carton clamping function of the rails 80A and 180A is reduced to a carton guiding function. The de-energization of the solenoid valve 195 also simultaneously effects retraction of the stop paddle 225. Accordingly, the carton is released from the station Y for forward transport by the chain conveyor 59–159. The simultaneous energization of relay coil 3410 caused it to close its holding switch 341–1, open its low power drive switch 341–2 (FIG. 15) to cut out the rheostat 344, and close its high power drive switch 341–3 (same figure) for more strongly energizing the chain conveyor driving clutch 67–2. With this shift from low power drive of the chain conveyor 59–159 to such high power drive thereof and with the simultaneous release of the carton from the station Y the flight bar 64–1 which had been urged against the back end of the carton under low power now drives the carton forward under such high power drive to transport the carton forward toward transport through the adhesive applying mechanism.

As the carton began moving forward from its pausing position 234–1 at the station Y its far sidewall ultimately was carried forward to point where the trigger 129A of the kicker control switch 128A was released behind the back edge of this carton sidewall. Consequently, the resulting closure of the kicker control switch 128A at this instant caused energization of the kicker control valve 198 through the released-to-closure head switch 149–3, thereby causing the top back flap kicker 161 to be swung down by its pneumatic motor 163 for effecting forward infolding of the upstanding top back flap in the plane of the infolded top front flap for reception of adhesive to their upper horizontal faces.

The de-energization of the solenoid valve 195 to convert the clamping rails 80A and 180A to guide rails and to retract the stop paddle 225 is accompanied by de-energization of the solenoid valve 5260 which is shunted therearound, so that the pneumatic motor 526 is permitted to retract or lower the initial conveyor carriage 501, thereby leaving the temporarily closed carton supported on the oblique rollers 507 and 507–1 for forward transport by the now high power driven chain conveyor 59–159.

As the carton is transported forward between the bottom and top adhesive applying mechanism the operation previously described in connection with FIGS. 18 to 28 incl. progressively takes place, since the head switch 149–1 is now closed to provide power to the parallel circuits 595 and 596 in which is embodied the adhesive application control switches 555, 556, 557 and 558, periodically to energize and de-energize the solenoid valves 5350 and 5360 simultaneously, as above described.

With such forward travel of the chain conveyor 59–159 under high power for transporting the carton through the adhesive application mechanism the limit switch 235 will be tripped by lug 166–1 on the conveyor chain 159 (FIG. 14) immediately after the carton starts to move forward from station Y, to open its switch 235–1 at that time. Soon thereafter the lug 166–1 on the conveyor chain 159 also opens a limit switch device at the point 435 (not shown in FIG. 14) to open its switch 435–1 (FIG. 16). The limit switch device 435 will be similar to limit switch devices 135 and 235, except that 435 contains only a single normally closed switch 435–1 to be opened upon tripping. This avoids any possibility of such sensing circuit becoming energized to cause the stop paddle 225 to be undesirably raised at this time and the side rails 80A and 180A to apply strong clamping action to the rapidly traveling carton, as well as undesirable lift of the retracted carriage 501.

After the long lug 166–1 has passed the limit switch 235 to close the circuit switch 235–1 for effecting reenergization of the solenoid valves 195 and 5260, re-energization of the solenoid valve 195 allows the guide rails 80A and 180A to retract away from the sidewalls of the now sealed carton by virtue of the fact that the circuit of solenoid valve 194 was broken by opening of the photoswitch 140–1 when the carton left the station Y. The separation of the guide rails 80A and 180A is accompanied by lift again of the stop paddle 225.

As the sealed carton approaches the discharge end 8 of the bed unit 1 of the machine to be delivered over the delivery rolls 551 (FIG. 3) the long lug 166–1 on the far conveyor chain 159 ultimately passes beyond the limit switch located at the point 435 (FIG. 14) to release the latter for closure of switch 435–1, so as to supply power through closed photoswitch 140–2 and biased-closed upper limit switch 186–2 to energize the "Up" relay coil 2530. As a result, the reversing switches 253 of the elevating motor 174 (FIG. 15) are closed by the energization of this relay 2530 for raising the elevator head 2 until the upper limit 186–2 is opened by contact of the trigger 187 with the manually adjustable stop 193 (FIG. 1). This causes the front top end flap folding arm 146 to drop down to again allow the head switch 149 to return to its initial condition of opening of its kicker switch 149–3, so the kicker solenoid valve 198 is de-energized for reaching the back top flap kicker 161.

With the freeing of the trigger 236 by the passing of the long trip lug 166–1 on the far conveyor chain 159 limit switch 235 was permitted to close not only its switch 235–1 but also, simultaneously, its switch 235–2 again to energize the gate retracting solenoid valve 197. The resulting lowering of the entrance gate 12 allows the next carton (at position 234–2, FIG. 1) to enter the machine.

It is to be noted that the opening of the limit switch 235–2 when the leading end of the long trip lug 166–1 first lifted the trigger 236 of the limit switch 235 upon release of the carton at the station Y for forward travel under high power drive of the chain conveyor 59–159 broke the holding circuit created by the previous closure of the photoswitch 138–1 as the previous carton entered the machine. This is the circuit of the relay 3410 through its holding switch 341–1 and the closed limit switch 135–3 which was permitted to close during the running of the chain conveyor 59–159 until the second trip lug 66–2 came around to trip limit switch trigger 136 again for recycling with the next supplied carton. With attendant de-energization of the relay 3410 it reopens its high power chain conveyor drive switch 341–3 and again closes its low power chain conveyor drive switch 341–2 for the repeat operation.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is the novel subjects matter defined in the following claims.

We claim:
1. In an automatic carton closing machine, for partially opening previously infolded bottom side flaps of a contents-loaded carton which are lapped beneath previously infolded leading and trailing bottom end flaps thereof to apply flap-anchoring adhesive therebetween and refold upward these side flaps, adhesive-applying mechanism comprising, lateral conveyor means for transporting such a carton forward along a defined lateral path of travel from an entrance end to a discharge end of said machine, a pair of transversely-spaced series of longitudinally-spaced rollers having the generatrices of the top portions of the curved surfaces of one series thereof extending obliquely down toward and crossing those of the other series whereby as each loaded carton is fed forward thereover the bottom edges of the opposite sidewalls of such advancing carton are supported on said series of rollers and during the carton advance the load of the carton contents and the force of gravity cause the opposed free ends of the infolded bottom side flaps to drop down through oblique angles to provide a gap between, adhesive-applying head means supported in a relatively fixed location beneath the path of travel to enter the gap between said opposed free ends of the bottom side flaps as the loaded carton is transported forward thereabove by said conveyor means and to apply fluid adhesive to the bottom faces of said infolded bottom end flaps as the latter pass successively above said adhesive-applying head means, and means to return said obliquely supported bottom side flaps up to abutment of the adhesive-carrying bottom faces of said bottom end flaps after passing said adhesive-applying head means and then to hold such lifted side flaps in such abutting positions during further forward carton transport until the applied adhesive sets sufficiently to anchor said lifted bottom side flaps to said bottom end flaps; characterized by a pair of transversely- spaced and longitudinally-extending guide rails having opposed inner side portions with at least one of said rails being movable transversely inward relative to the other for locating said opposed inner side portions of said rails in abutment adjacency to opposite sidewalls of the advancing carton and transversely outward away from the other for free reception therebetween of a next-following carton, means rotatably supporting one of said series of support rollers on each of said guide rails with the rollers in each series projecting inwardly beyond said inner side portion of the guide rail supporting them, and means automatically to effect such inward and outward movement in timed relation to the operation of other operative equipment of the machine including the conveyor means.

2. The adhesive-applying mechanism defined in claim 1 in which an initial section of said conveyor means preceding the location of said adhesive-applying head means is in the form of a lowerable raised carriage equipped at the top thereof with a longitudinal series of longitudinally-spaced and transversely-extending, lateral carton supporting transport members with initial sections of said pair of series of support rollers flanking opposite sides of said lowerable carriage and with said flanking rollers intervening said carton supporting transport members of said carriage, whereby the support of the bottom of an entering carton may be transferred to said support rollers from these carton supporting transport members of said carriage upon lowering of the latter, and means are provided on said carriage to transport a carton forward over said lateral supporting members.

3. The adhesive-applying mechanism defined in claim 1 in which an initial section of said conveyor means is flanked on opposite sides by initial sections of said pair of guide rails with these initial rail sections being equipped with at least some of said support rollers, said initial conveyor section being in the form of a downwardly-retractable raised carriage equipped at the top thereof with a longitudinal series of longitudinally-spaced and transversely-extending driven transport rolls intervened in the raised position by the support rollers of said initial sections of said guide rails for transfer to said initial section support rollers from said carriage rolls of the support of the bottom of an entering carton when said carriage is downwardly retracted with said guide rails located inward adjacent the opposite sides of this carton.

4. The adhesive-applying mechanism defined in claim 1 wherein said adhesive-applying head means has associated therewith flow control means periodically to start and stop flow of liquid adhesive therethrough, and said mechanism includes carton responsive sensing means carried by one of said guide rails to determine successively the positions of the leading hinge end and trailing free end of the leading infolded bottom end flap and of the leading free end and trailing hinge end of the trailing infolded bottom end flap as such a carton passes said adhesive-applying head means, and means responsive to said sensing means to dictate operation of said flow control means for causing periodically and successively delivery and flow stoppage of liquid adhesive from said head means in properly timed relation to the forward travel of the carton past the latter for confining delivery of adhesive therefrom to areas of the bottom faces of the infolded bottom end flaps of said carton.

5. The adhesive-applying mechanism defined in claim 4 in which said sensing means is in the form of four control elements successively arranged along the one of said guide rail which carries them with at least the first and fourth thereof being adjustable in position longitudinally along the carton path of travel, and said mechanism includes means automatically to adjust in the carton travel path direction said first and fourth control elements respectively relative to the second and third control elements simultaneously either closer thereto or farther away therefrom in relation to the width of each advancing carton, and means responsive to the degree of inward movement of said movable guide rail which is determined by the carton width automatically dictating, when such carton is of appreciable width, operation of said control elements adjusting means to effect greater spacing of said first and fourth control elements from said second and third control elements respectively than when the carton is narrower.

6. The adhesive-applying mechanism defined in claim 5 wherein said four control elements are mounted on said transversely movable one of said guide rails and said control elements adjusting means is in the form of longitudinal translating means carried by said movable rail for moving said first and fourth control elements back and forth thereon with inward and outward movement of said rail toward and away from the line of travel of the opposed sidewall of the carton advancing between said pair of guide rails, said second and third control elements being mounted on said movable rail in relatively fixed positions.

7. The adhesive-applying mechanism defined in claim 6 wherein both of said guide rails are movable simultaneously inward and outward relative to each other and each of said control elements has an operating trigger extended inward from the inner carton abutting side portion of said transversely-movable guide rail which carries said control elements into the path of the opposed sidewall of the carton as the latter is advanced therealong with one control condition of each control element being dictated by its trigger when the latter is free from engagement with carton structure and another control condition of each such control element being dictated by its trigger when the latter is engaged by carton sidewall structure.

8. The adhesive-applying mechanism defined in claim 5 wherein said automatic control elements adjusting means is in the form of a pair of substantially parallel and longitudinally-slidable rack bars each having a series of rack teeth, rotatable pinion means is meshed with both series of rack teeth for simultaneous longitudinal sliding of said rack bars in opposite direction, and said dictating means is in a form to rotate said pinion means in one direction in response to narrower carton width and in the opposite direction in response to wider carton width, and means are provided adjustably to fix said first and fourth control elements respectively to one and the other of said rack bars.

References Cited

UNITED STATES PATENTS 2,252,435  8/1941  Lust _____ 53—374
3,302,367  2/1967  Talarico _____ 53—76 X TRAVIS J. McGEHEE, Primary Examiner U.S. Cl. X.R.

53—284, 374